(12) United States Patent
Kuwata

(10) Patent No.: US 9,469,701 B2
(45) Date of Patent: Oct. 18, 2016

(54) POLYETHYLENE POWDER

(71) Applicant: Asahi Kasei Chemicals Corporation, Tokyo (JP)

(72) Inventor: Kotaro Kuwata, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 14/940,387

(22) Filed: Nov. 13, 2015

(65) Prior Publication Data

US 2016/0137760 A1    May 19, 2016

(30) Foreign Application Priority Data

Nov. 14, 2014  (JP) ................. 2014-231849

(51) Int. Cl.
*C08F 10/02*  (2006.01)

(52) U.S. Cl.
CPC ................. *C08F 10/02* (2013.01)

(58) Field of Classification Search
CPC .............. C08F 10/02; Y10T 428/2982
USPC ........................................ 428/402
See application file for complete search history.

(56) References Cited

U.S. PATENT DOCUMENTS

| 4,760,120 | A | | 7/1988 | Sano et al. |
| 4,927,871 | A | * | 5/1990 | Ohori ............ C08F 255/00 524/230 |
| 4,962,167 | A | | 10/1990 | Shiraishi et al. |
| 4,972,035 | A | * | 11/1990 | Suga ............ C08J 3/12 526/125.6 |
| 5,087,522 | A | * | 2/1992 | Bailly ............ C08F 10/00 428/402 |
| 5,587,440 | A | | 12/1996 | Ehlers et al. |
| 8,173,755 | B2 | * | 5/2012 | Fujiwara ............ C08F 10/00 526/123.1 |
| 2006/0135699 | A1 | * | 6/2006 | Li ............ C08L 23/10 525/240 |
| 2009/0306234 | A1 | * | 12/2009 | Ameye ............ C08F 10/02 521/59 |

FOREIGN PATENT DOCUMENTS

| EP | 0349146 A2 | | 1/1990 |
| JP | S61-283606 A | | 12/1986 |
| JP | S62-141006 A | | 6/1987 |
| JP | S63-033403 A | | 2/1988 |
| JP | H01-129006 A | | 5/1989 |
| JP | H02-020510 A | | 1/1990 |
| JP | H02-070710 A | | 3/1990 |
| JP | H07-149831 A | | 6/1995 |
| JP | 09-291112 | * | 11/1997 |
| JP | H09-291112 A | | 11/1997 |
| JP | 2006-00214601 | * | 1/2006 |
| JP | 2006-002146 A | | 4/2006 |
| JP | 2007-119751 A | | 5/2007 |
| JP | 2007-284664 A | | 11/2007 |

* cited by examiner

*Primary Examiner* — Leszek Kiliman
(74) *Attorney, Agent, or Firm* — Morgan, Lewis & Bockius LLP

(57) ABSTRACT

The present invention provides a polyolefin powder including a homopolymer of ethylene or a copolymer of ethylene and an α-olefin having 3 to 15 carbon atoms.

16 Claims, No Drawings

US 9,469,701 B2

POLYETHYLENE POWDER

BACKGROUND OF THE INVENTION

1. Field of the Invention

The present invention relates to a polyethylene powder.

2. Description of the Related Art

Ultrahigh-molecular-weight polyethylene powders have a viscosity-average molecular weight (Mv) that reaches 1,000,000 to 9,000,000 and are excellent in abrasion resistance, impact resistance, self-lubricating properties, chemical resistance, low-temperature characteristics, dimensional stability, light weight, safety for foods, etc. Therefore, these polyethylene powders are molded by various molding methods such as melt drawing, injection molding, extrusion molding, and compression molding and employed in various uses such as for films, sheets, microporous membranes, fibers, foams, and pipes. Particularly, the ultrahigh-molecular-weight polyethylene powders are used as raw materials for microporous membranes for separators of secondary batteries typified by lead storage batteries and lithium ion batteries and as raw materials for high-strength fibers.

In general, these ultrahigh-molecular-weight polyethylene powders are highly viscous when melted. Such ultrahigh-molecular-weight polyethylene powders are difficult to process by injection molding or the like and are therefore often molded after being dissolved in a solvent.

Particularly, ultrahigh-molecular-weight polyethylene threads are obtained as high-strength fibers, for example, by suspending an ultrahigh-molecular-weight polyethylene powder in a solvent or swelling and dissolving the ultrahigh-molecular-weight polyethylene powder in a solvent under heating, and feeding this suspension or solution to a screw extruder, followed by extrusion from the spinneret of a die and drawing.

In this operation, the ultrahigh-molecular-weight polyethylene powder having low solubility in the solvent yields an undissolved powder residue, which becomes responsible for the clogging of a screen mesh in an extruder. Even if spinning can be achieved, unmelted components disadvantageously serve as a point of rupture so that end breakages occur during drawing. Particularly, in the case of threads, the exhibition of higher strength requires higher drawing. Thus, the undissolved powder residue causes disadvantageous end breakages during production and becomes a major problem.

In recent years, ultrahigh-molecular-weight polyethylene having a higher viscosity-average molecular weight has also been used for attaining the higher strength of threads or the lighter weights of products produced from the threads. Unfortunately, problems associated with the undissolved residue have occurred more frequently.

Some methods have been disclosed as methods for producing ultrahigh-molecular-weight polyethylene. For example, a method for producing ultrahigh-molecular-weight polyethylene having both of a narrow molecular weight distribution and a high bulk density by use of a mixed catalyst consisting of a titanium component and an organic aluminum compound has been reported (Patent Literature 1).

A method for producing ultrahigh-molecular-weight polyethylene that has a narrow molecular weight distribution and a high bulk density, has a narrow particle size distribution, is free from fine powders, and is excellent in the shape of particles by use of a metallocene-supported catalyst has also been reported (Patent Literature 2).

A method for producing ultrahigh-molecular-weight polyethylene having a wide molecular weight distribution and a low bulk density by use of a mixed catalyst consisting of a titanium component and an organic aluminum compound has been further reported (Patent Literature 3).

CITATION LIST

Patent Literatures

Patent Literature 1: Japanese Patent Laid-Open No. H7-149831
Patent Literature 2: Japanese Patent Laid-Open No. H9-291112
Patent Literature 3: Japanese Patent Laid-Open No. S63-33403

The method described in Patent Literature 1 adopts an approach of enhancing the solubility in a solvent by narrowing the molecular weight distribution. However, the solubility in a solvent is still unsatisfactory. In addition, the narrow molecular weight distribution disadvantageously results in the poor drawing properties or strength of threads.

The method described in Patent Literature 2 adopts an approach of improving the solubility in a solvent by further narrowing the particle size distribution and improving the shape of particles. However, its effects are still insufficient. In addition, the narrow molecular weight distribution disadvantageously results in the poor drawing properties or strength of threads.

The method described in Patent Literature 3 produces a thread having high strength because of the wide molecular weight distribution. However, the low bulk density disadvantageously results in low solubility in a solvent.

As described above, for the conventional polyethylene powders, approaches have been studied for producing high-performance threads with high productivity by controlling the molecular weight distribution, the bulk density, the particle size distribution, or the shape of particles. However, their performance is still unsatisfactory for a demand for the further enhanced productivity of threads.

The present invention has been made in light of these problems, and an object of the present invention is to provide a polyethylene powder which has excellent solubility and is capable of further enhancing thread productivity.

SUMMARY OF THE INVENTION

The present inventors have conducted diligent studies to attain the object and consequently completed the present invention by finding that, surprisingly, the object can be attained when the viscosity-average molecular weight ratio and the bulk density ratio between a powder having a large particle size and a powder having a small particle size in the classification of a polyethylene powder through screen meshes having a predetermined aperture size have specific values.

Specifically, the present invention is as follows:
[1] A polyolefin powder comprising a homopolymer of ethylene or a copolymer of ethylene and an α-olefin having 3 to 15 carbon atoms, wherein
the polyolefin powder has a viscosity-average molecular weight of 800,000 to 13,000,000,
a ratio ($Mv_{75}/Mv_{250}$) of a viscosity-average molecular weight ($Mv_{75}$) of a pass-powder in a classification of the polyolefin powder through a screen mesh having an aperture size of 75 μm to a viscosity-average molecular weight ($Mv_{250}$) of an on-powder in the classification thereof through a screen mesh having an aperture size of 250 μm is 0.7 to 1.4, a ratio ($BD_{75}/BD_{250}$) of a bulk density ($BD_{75}$) of a pass-powder in the classification of the polyolefin powder through a screen mesh having an aperture size of 75 μm to a bulk density ($BD_{250}$) of an on-powder in the classification thereof through a screen mesh having an aperture size of 250 μm is 0.7 to 1.4, and the polyolefin powder has an average particle size of 200 μm or smaller.

[2] The polyolefin powder according to [1], wherein the $Mv_{75}/Mv_{250}$ is 0.8 to 1.2.

[3] The polyolefin powder according to [1] or [2], wherein the $Mv_{75}/Mv_{250}$ is 0.9 to 1.1.

[4] The polyolefin powder according to any one of [1] to [3], wherein the $BD_{75}/BD_{250}$ is 0.8 to 1.2.

[5] The polyolefin powder according to any one of [1] to [4], wherein the $BD_{75}/BD_{250}$ is 0.9 to 1.1.

[6] A fiber which is produced from the polyolefin powder according to any one of [1] to [5].

The present invention can provide a polyethylene powder which has excellent solubility and is capable of further enhancing thread productivity.

DETAILED DESCRIPTION OF THE PREFERRED EMBODIMENTS

Hereinafter, a mode for carrying out the present invention (hereinafter, referred to as the "present embodiment") will be described in detail. However, the present embodiment is not intended to be limited to those described below. Various changes or modifications can be made in the present invention without departing from the spirit thereof.

[Polyolefin Powder]

The polyolefin powder of the present embodiment is a polyolefin powder comprising a homopolymer of ethylene or a copolymer of ethylene and an α-olefin having 3 to 15 carbon atoms, wherein the polyolefin powder has a viscosity-average molecular weight of 800,000 to 13,000,000, the ratio ($Mv_{75}/Mv_{250}$) of the viscosity-average molecular weight ($Mv_{75}$) of a pass-powder in the classification of the polyolefin powder through a screen mesh having an aperture size of 75 μm to the viscosity-average molecular weight ($Mv_{250}$) of an on-powder in the classification thereof through a screen mesh having an aperture size of 250 μm is 0.7 to 1.4, the ratio ($BD_{75}/BD_{250}$) of the bulk density ($BD_{75}$) of a pass-powder in the classification of the polyolefin powder through a screen mesh having an aperture size of 75 μm to the bulk density ($BD_{250}$) of an on-powder in the classification thereof through a screen mesh having an aperture size of 250 μm is 0.7 to 1.4, and the polyolefin powder has an average particle size of 200 μm or smaller.

The polyethylene powder of the present embodiment thus configured has exceedingly favorable solubility in a solvent and yields only a small amount of an undissolved powder residue before a spinning step. Therefore, the polyethylene powder of the present embodiment is capable of further enhancing thread productivity without causing the clogging of a screen mesh in an extruder, end breakages during drawing, etc.

The polyethylene powder of the present embodiment comprises a homopolymer of ethylene or a copolymer of ethylene and an α-olefin having 3 to 15 carbon atoms. Examples of the α-olefin having 3 to 15 carbon atoms include, but are not particularly limited to, propylene, 1-butene, 1-pentene, 1-hexene, and 1-octene.

[Viscosity-Average Molecular Weight (Mv)]

The viscosity-average molecular weight (Mv) of the polyethylene powder is 800,000 or higher, preferably 2,000,000 or higher, more preferably 3,000,000 or higher. Also, the viscosity-average molecular weight (Mv) of the polyethylene powder is 13,000,000 or lower, preferably 10,000,000 or lower, more preferably 8,000,000 or lower. When the viscosity-average molecular weight of the polyethylene powder is 800,000 or higher, a thread obtained by the molding of the polyethylene powder has better strength. Also, the polyethylene powder having a viscosity-average molecular weight of 13,000,000 or lower has better solubility. The viscosity-average molecular weight can be controlled by the adjustment of a polymerization temperature or a polymerization pressure during polyethylene production. The viscosity-average molecular weight of the polyethylene powder can be determined by a method described in Examples mentioned later.

[Ratio ($Mv_{75}/Mv_{250}$)]

The ratio ($Mv_{75}/Mv_{250}$) is 0.7 to 1.4, preferably 0.8 to 1.2, more preferably 0.9 to 1.1. The ratio ($Mv_{75}/Mv_{250}$) of 0.7 or more can prevent a powder having a large particle size from having too high a viscosity-average molecular weight. As a result, the powder having a large particle size has better solubility in a solvent and can reduce the disadvantages to drawing attributed to an undissolved residue. On the other hand, the ratio ($Mv_{75}/Mv_{250}$) of 1.4 or less can prevent a powder having a small particle size from having too high a viscosity-average molecular weight. As a result, the powder having a small particle size can be prevented from having reduced solubility in a solvent due to the aggregation of the particles of the powder and can reduce the disadvantages to drawing attributed to an undissolved residue. The ratio ($Mv_{75}/Mv_{250}$) refers to the ratio of the viscosity-average molecular weight ($Mv_{75}$) of a powder that has passed through a mesh (hereinafter, also referred to as a "pass-powder") in the classification of the polyethylene powder through a screen mesh having an aperture size of 75 μm to the viscosity-average molecular weight ($Mv_{250}$) of a powder that has remained on a mesh (hereinafter, also referred to as an "on-powder") in the classification thereof through a screen mesh having an aperture size of 250 μm.

The ratio ($Mv_{75}/Mv_{250}$) can be controlled by the selection of the polymerization catalyst of the present invention. The viscosity-average molecular weight ($Mv_{250}$) and the viscosity-average molecular weight ($Mv_{75}$) can be determined by a method described in Examples mentioned later. From these values, the ratio ($Mv_{75}/Mv_{250}$) can be calculated.

[Ratio ($BD_{75}/BD_{250}$)]

The ratio ($BD_{75}/BD_{250}$) is 0.7 to 1.4, preferably 0.8 to 1.2, more preferably 0.9 to 1.1. The ratio ($BD_{75}/BD_{250}$) of 0.7 or more can prevent a powder having a large particle size from having too high a bulk density. As a result, the powder having a large particle size can promote the penetration of a solvent thereinto and can reduce the disadvantages to drawing attributed to an undissolved residue. Also, the ratio ($BD_{75}/BD_{250}$) of 1.4 or less can prevent a powder having a small particle size from having too high a bulk density. As a result, the powder having a small particle size can be prevented from having reduced solubility in a solvent due to the aggregation of the particles of the powder and can reduce the disadvantages to drawing attributed to an undissolved residue. The ratio ($BD_{75}/BD_{250}$) refers to the ratio of the bulk density ($BD_{75}$) of a pass-powder in the classification of the polyethylene powder through a screen mesh having an aperture size of 75 μm to the bulk density ($BD_{250}$) of an on-powder in the classification thereof through a screen mesh having an aperture size of 250 μm.

The ratio ($BD_{75}/BD_{250}$) can be controlled by the selection of the polymerization catalyst of the present invention. The bulk density ($BD_{250}$) and the bulk density ($BD_{75}$) can be determined by a method described in Examples mentioned later. From these values, the ratio ($BD_{75}/BD_{250}$) can be calculated.

[Particle Size]

The average particle size of the polyethylene powder is 200 μm or smaller, preferably 175 μm or smaller, more preferably 150 μm or smaller. Also, the average particle size of the polyethylene powder is preferably 10 μm or larger. The polyethylene powder having an average particle size of 200 μm or smaller has better solubility in a solvent and can reduce an undissolved residue, which is a disadvantage to drawing. The polyethylene powder having an average particle size of 10 μm or larger tends to be prevented from flying and therefore have better handleability. In addition, the polyethylene powder having an average particle size of 10 μm or larger tends to be prevented from forming lumps when added to a solvent and therefore easily form homogeneous slurry. The "average particle size of the polyethylene powder" refers to the particle size at which the cumulative weight is 50%, i.e., a median size. The average particle size of the polyethylene powder can be calculated by a method described in Examples mentioned later.

The content of a polyethylene powder having a particle size of 300 μm or larger is preferably 0 to 5% by mass, more preferably 0 to 3% by mass, further preferably 0 to 1% by mass, with respect to 100% by mass of the whole polyethylene powder. The polyethylene powder containing the polyethylene powder having a particle size of 300 μm or larger at a content of 5% by mass or lower tends to have better solubility in a solvent. In this context, the content of the polyethylene powder having a particle size of 300 μm or larger can be measured by classification through a screen mesh having an aperture size of 300 μm.

The particle size of the polyethylene powder can be controlled by sieving through screen meshes having a specific aperture size. In the present embodiment, it is preferred to use a polyethylene powder that has passed through screen meshes having aperture sizes of 425 μm and 300 μm, particularly, among standard sieves according to the specification JIS Z8801, from the viewpoint of solubility in a solvent.

[Method for Producing Polyethylene Powder]

Next, the method for producing the polyethylene powder of the present embodiment will be described. The polyethylene powder can be obtained by the homopolymerization of ethylene or the copolymerization of ethylene and an α-olefin having 3 to 15 carbon atoms in the presence of a catalyst for olefin polymerization.

The catalyst for olefin polymerization is not particularly limited, and, for example, a general Ziegler-Natta catalyst or metallocene catalyst can be used in the production.

The Ziegler-Natta catalyst is preferably a catalyst for olefin polymerization comprising a solid catalytic component [A] and an organic metal compound component [B], wherein the solid catalytic component [A] is produced by reacting an organic magnesium compound (A-1) represented by the formula 1 which is soluble in an inert hydrocarbon solvent with a titanium compound (A-2) represented by the formula 2:

(A-1):$(M^1)\alpha(Mg)\beta(R^2)_a(R^3)_bY^1_c$     Formula 1

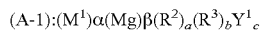

wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \leq \alpha$, $0<\beta$, $0 \leq a$, $0 \leq b$, $0 \leq c$, $0<a+b$, $0 \leq c/(\alpha+\beta) \leq 2$, and $n\alpha+2\beta=a+b+c$ (wherein n represents the valence of $M^1$); and (A-2):$Ti(OR^7)_dX^1_{4-d}$     Formula 2

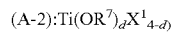

wherein d represents a real number of 0 or larger and 4 or smaller; $R^7$ represents a hydrocarbon group having 1 or more and 20 or less carbon atoms; and $X^1$ represents a halogen atom.

The organic magnesium compound (A-1) is represented in the form of an organic magnesium complex compound soluble in an inert hydrocarbon solvent, but encompasses all of dihydrocarbyl magnesium compounds and their complexes with other metal compounds. The relational expression $n\alpha+2\beta=a+b+c$ of the symbols α, β, a, b, and c represents the stoichiometry of metal atom valence and substituents.

In the formula 1, specific examples of the hydrocarbon group having 2 or more and 20 or less carbon atoms, represented by $R^2$ or $R^3$ include, but are not particularly limited to, alkyl groups, cycloalkyl groups, and aryl groups, for example, ethyl, propyl, butyl, propyl, hexyl, octyl, decyl, cyclohexyl, and phenyl groups. Among them, alkyl groups are preferred. When α>0, a metal atom selected from the group consisting of groups 12, 13, and 14 of the periodic system can be used as the metal atom $M^1$. Examples thereof include zinc, boron, and aluminum. Among them, aluminum and zinc are preferred.

The ratio β/α of magnesium to the metal atom $M^1$ is not particularly limited and is preferably 0.1 or more and 30 or less, more preferably 0.5 or more and 10 or less. In the case of using a predetermined organic magnesium compound wherein α=0, for example, a compound wherein $R^2$ is 1-methylpropyl is soluble in an inert hydrocarbon solvent. Such a compound also brings about a preferred consequence to the present embodiment. In the formula 1 wherein α=0, $R^2$ and $R^3$ preferably satisfy any one of the following three conditions (1), (2), and (3):

Condition (1): preferably, at least one of $R^2$ and $R^3$ is a secondary or tertiary alkyl group having 4 or more and 6 or less carbon atoms, more preferably, both of $R^2$ and $R^3$ are alkyl groups having 4 or more and 6 or less carbon atoms and at least one of the groups is a secondary or tertiary alkyl group;

Condition (2): preferably, $R^2$ and $R^3$ are alkyl groups differing in the number of carbon atoms, more preferably, $R^2$ is an alkyl group having 2 or 3 carbon atoms and $R^3$ is an alkyl group having 4 or more carbon atoms; and Condition (3): preferably, at least one of $R^2$ and $R^3$ is a hydrocarbon group having 6 or more carbon atoms, more preferably, an alkyl group wherein the total number of carbon atoms contained in $R^2$ and $R^3$ is 12 or more.

Hereinafter, these groups will be shown specifically. In Condition (1), specific examples of the secondary or tertiary alkyl group having 4 or more and 6 or less carbon atoms include 2-butyl, 2-methylpropyl, t-butyl, 2-methylbutyl, 2-methyl-1-butyl, 2,2-dimethylpropyl, 2-methylpentyl, 2-ethylbutyl, 2,2-dimethylbutyl, and 2-methyl-2-ethylpropyl groups. Among them, a 2-butyl group is particularly preferred.

In Condition (2), specific examples of the alkyl group having 2 or 3 carbon atoms include ethyl, 1-methylethyl, and propyl groups. Among them, an ethyl group is particularly preferred. Specific examples of the alkyl group having 4 or more carbon atoms include, but are not particularly limited to, butyl, pentyl, hexyl, heptyl, and octyl groups. Among them, butyl and hexyl groups are particularly preferred.

In Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. An alkyl group having a moderate chain length is therefore preferably used in terms of handling. The organic magnesium compound can be diluted, for use, with an inert hydrocarbon solvent. This solution can be used without any problem even if trace amounts of Lewis basic compounds such as ethers, esters, and amines are contained or remain therein.

Next, $Y^1$ will be described. In the formula 1, $Y^1$ is any of alkoxy, siloxy, allyloxy, amino, amide, —N=C—$R^4$, $R^5$, —$SR^6$ (wherein $R^4$, $R^5$, and $R^6$ each independently represent a hydrocarbon group having 2 or more and 20 or less carbon atoms), and β-keto acid residue.

In the formula, the hydrocarbon group represented by $R^4$, $R^5$, or $R^6$ is preferably an alkyl or aryl group having 1 or more and 12 or less carbon atoms, particularly preferably an alkyl or aryl group having 3 or more and 10 or less carbon atoms. Examples thereof include, but are not particularly limited to, methyl, ethyl, propyl, butyl, t-butyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 2-butyl, 2-methylpentyl, and 2-ethylhexyl groups are particularly preferred.

In the formula 1, $Y^1$ is preferably an alkoxy group or a siloxy group. Specific examples of the alkoxy group preferably include, but are not particularly limited to, methoxy, ethoxy, propoxy, 1-methylethoxy, butoxy, 1-methylpropoxy, 1,1-dimethylethoxy, pentoxy, hexoxy, 2-methylpentoxy, 2-ethylbutoxy, 2-ethylpentoxy, 2-ethylhexoxy, 2-ethyl-4-methylpentoxy, 2-propylheptoxy, 2-ethyl-5-methyloctoxy, octoxy, phenoxy, and naphthoxy groups. Among them, butoxy, 1-methylpropoxy, 2-methylpentoxy, and 2-ethylhexoxy groups are more preferred. Specific examples of the siloxy group preferably include, but are not particularly limited to, hydrodimethylsiloxy, ethylhydromethylsiloxy, diethylhydrosiloxy, trimethylsiloxy, ethyldimethylsiloxy, diethylmethylsiloxy, and triethylsiloxy groups. Among them, hydrodimethylsiloxy, ethylhydromethylsiloxy, diethylhydrosiloxy, and trimethylsiloxy groups are more preferred.

In the present embodiment, the compound (A-1) can be synthesized by any method without particular limitations and may be synthesized by reacting an organic magnesium compound selected from the group consisting of the formulas $R^2MgX^1$ and $R^2_2Mg$ (wherein $R^2$ is as defined above, and $X^1$ represents halogen) with an organic metal compound selected from the group consisting of the formulas $M^1R^3_n$ and $M^1R^3_{(n-1)}H$ (wherein $M^1$ and $R^3$ are as defined above, and n represents the valence of $M^1$) at 25° C. or higher and 150° C. or lower in an inert hydrocarbon solvent and, if necessary, subsequently with a compound represented by the formula $Y^1$—H (wherein $Y^1$ is as defined above) or with an organic magnesium compound and/or an organic aluminum compound having a functional group represented by $Y^1$. In the approach of reacting the organic magnesium compound soluble in an inert hydrocarbon solvent with a compound represented by the formula $Y^1$—H, the order in which the compounds are added to the reaction system is not particularly limited. Any of the following methods can be used: the compound represented by the formula $Y^1$—H is added into the organic magnesium compound; the organic magnesium compound is added into the compound represented by the formula $Y^1$—H; and both of the compounds are added at the same time. For the preparation of the compound (A-1), the stirring rate of the catalyst in the reactor is important from the viewpoint of controlling the particle size of the catalyst. The stirring rate is preferably 105 rpm or higher and 295 rpm or lower. The stirring rate of 105 rpm or higher can prevent the catalyst from having too coarse a particle size. The stirring rate of 295 rpm or lower can prevent the catalyst from having too fine a particle size. The particle size of the catalyst is reflected to the particle size of the finally produced polyethylene powder and is therefore very important to manage.

In the present embodiment, the molar composition ratio $c/(\alpha+\beta)$ of $Y^1$ to all metal atoms in the compound (A-1) is in the range of $0 \leq c/(\alpha+\beta) \leq 2$, preferably $0 \leq c/(\alpha+\beta) < 1$. The compound (A-1) wherein the molar composition ratio of $Y^1$ to all metal atoms is 2 or less tends to have better reactivity with the compound (A-2).

Next, the compound (A-2) will be described. The compound (A-2) is a titanium compound represented by the formula 2:

$$(A\text{-}2): \text{Ti}(OR^7)_d X^1_{(4-d)} \quad \text{Formula 2}$$

wherein d represents a real number of 0 or larger and 4 or smaller; $R^7$ represents a hydrocarbon group having 1 or more and 20 or less carbon atoms; and $X^1$ represents a halogen atom.

In the formula 2, d is preferably 0 or larger and 1 or smaller, more preferably 0. In the formula 2, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Examples of the halogen represented by $X^1$ include chlorine, bromine, and iodine. Among them, chlorine is preferred. In the present embodiment, the compound (A-2) is most preferably titanium tetrachloride. In the present embodiment, two or more titanium compounds selected from these compounds may be used as a mixture.

Next, the reaction between the compounds (A-1) and (A-2) will be described. This reaction is preferably carried out in an inert hydrocarbon solvent. Specific examples of the inert hydrocarbon solvent include, but are not particularly limited to: aliphatic hydrocarbons such as pentane, hexane, and heptane; aromatic hydrocarbons such as benzene and toluene; and alicyclic hydrocarbons such as cyclohexane and methylcyclohexane. Among them, aliphatic hydrocarbon solvents such as hexane and heptane are more preferred for carrying out the reaction.

In this reaction, the molar ratio between (A-1) and (A-2) is not particularly limited, and the molar ratio (Ti/Mg) of Ti atom contained in the compound (A-2) to Mg atom contained in the compound (A-1) is preferably 0.1 or more and 10 or less, more preferably 0.3 or more and 3 or less. The reaction temperature is not particularly limited and is −80° C. or higher and 150° C. or lower, more preferably −40° C. to 100° C. The order in which the compounds (A-1) and (A-2) are added to the inert hydrocarbon solvent is not particularly limited. Any of the following methods can be used: the compound (A-2) is added subsequently to the compound (A-1); the compound (A-1) is added subsequently to the compound (A-2); and the compounds (A-1) and (A-2) are added at the same time. The method of adding the compounds (A-1) and (A-2) at the same time is preferred. In the present embodiment, the solid catalytic component [A] obtained by the reaction is used as a slurry solution with an inert hydrocarbon solvent.

As another example, the Ziegler-Natta catalytic component is preferably a catalyst for olefin polymerization comprising a solid catalytic component [C] and an organic metal compound component [B], wherein the solid catalytic component [C] is produced by reacting an organic magnesium compound (C-1) represented by the formula 3 which is soluble in an inert hydrocarbon solvent with a chlorinating agent (C-2) represented by the formula 4, and allowing an organic magnesium compound (C-4) represented by the formula 5 which is soluble in an inert hydrocarbon solvent and a titanium compound (C-5) represented by the formula 6 to be supported by a carrier (C-3) thus prepared:

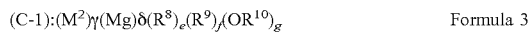

(C-1):$(M^2)_\gamma(Mg)_\delta(R^8)_e(R^9)_f(OR^{10})_g$   Formula 3 wherein $M^2$ represents a metal atom selected from the group consisting of groups 12, 13, and 14 of the periodic system; $R^8$, $R^9$, and $R^{10}$ each represent a hydrocarbon group having 2 or more and 20 or less carbon atoms; and γ, δ, e, f, and g each represent a real number that satisfies the following relationships: $0 \leq \gamma$, $0 < \delta$, $0 \leq e$, $0 \leq f$, $0 \leq g$, $0 < e+f$, $0 \leq g/(\gamma+\delta) \leq 2$, and $k\gamma + 2\delta = e+f+g$ (wherein k represents the valence of $M^2$);

(C-2):$H_hSiCl_iR^{11}{}_{(4-(h+i))}$   Formula 4 wherein $R^{11}$ represents a hydrocarbon group having 1 or more and 12 or less carbon atoms; and h and i each represent a real number that satisfies the following relationships: $0 < h$, $0 < i$, and $0 < h+i \leq 4$;

(C-4):$(M^1)_\alpha(Mg)_\beta(R^2)_a(R^3)_bY^1{}_c$   Formula 5 wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \leq \alpha$, $0 < \beta$, $0 \leq a$, $0 \leq b$, $0 \leq c$, $0 < a+b$, $0 \leq c/(\alpha+\beta) \leq 2$, and $n\alpha + 2\beta = a+b+c$ (wherein n represents the valence of $M^1$); and

(C-5):$Ti(OR^7)_dX^1{}_{(4-d)}$   Formula 6 wherein d represents a real number of 0 or larger and 4 or smaller; $R^7$ represents a hydrocarbon group having 1 or more and 20 or less carbon atoms; and $X^1$ represents a halogen atom.

First, the compound (C-1) will be described. The compound (C-1) is represented in the form of an organic magnesium complex compound soluble in an inert hydrocarbon solvent, but encompasses all of dihydrocarbyl magnesium compounds and their complexes with other metal compounds. In the formula 3, the relational expression $k\gamma + 2\delta = e+f+g$ of the symbols γ, δ, e, f, and g represents the stoichiometry of metal atom valence and substituents.

In the formula, specific examples of the hydrocarbon group represented by $R^8$ or $R^9$ include, but are not particularly limited to, alkyl groups, cycloalkyl groups, and aryl groups, for example, methyl, ethyl, propyl, butyl, propyl, hexyl, octyl, decyl, cyclohexyl, and phenyl groups. Among them, alkyl groups are preferred for each of $R^8$ and $R^9$. When γ>0, a metal atom selected from the group consisting of groups 12, 13, and 14 of the periodic system can be used as the metal atom $M^2$. Examples thereof include zinc, boron, and aluminum. Among them, aluminum and zinc are particularly preferred.

The ratio δ/γ of magnesium to the metal atom $M^2$ is not particularly limited and is preferably 0.1 or more and 30 or less, more preferably 0.5 or more and 10 or less. In the case of using a predetermined organic magnesium compound wherein γ=0, for example, a compound wherein $R^8$ is 1-methylpropyl is soluble in an inert hydrocarbon solvent. Such a compound also brings about a preferred consequence to the present embodiment. In the formula 3 wherein γ=0, $R^8$ and $R^9$ preferably satisfy any one of the following three conditions (1), (2), and (3):

Condition (1): preferably, at least one of $R^8$ and $R^9$ is a secondary or tertiary alkyl group having 4 or more and 6 or less carbon atoms, more preferably, both of $R^8$ and $R^9$ are alkyl groups having 4 or more and 6 or less carbon atoms and at least one of the groups is a secondary or tertiary alkyl group;

Condition (2): preferably, $R^8$ and $R^9$ are alkyl groups differing in the number of carbon atoms, more preferably, $R^8$ is an alkyl group having 2 or 3 carbon atoms and $R^9$ is an alkyl group having 4 or more carbon atoms; and Condition (3): preferably, at least one of $R^8$ and $R^9$ is a hydrocarbon group having 6 or more carbon atoms, more preferably, an alkyl group wherein the total number of carbon atoms contained in $R^8$ and $R^9$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), examples of the alkyl group having 2 or 3 carbon atoms include ethyl, 1-methylethyl, and propyl groups. Among them, an ethyl group is particularly preferred. Specific examples of the alkyl group having 4 or more carbon atoms include, but are not particularly limited to, butyl, pentyl, hexyl, heptyl, and octyl groups. Among them, butyl and hexyl groups are particularly preferred.

In Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderately long-chain alkyl group is therefore preferably used in terms of handling. The organic magnesium compound is used as an inert hydrocarbon solution. This solution can be used without any problem even if trace amounts of Lewis basic compounds such as ethers, esters, and amines are contained or remain therein.

Next, the alkoxy group (OR$^{10}$) will be described. The hydrocarbon group represented by R$^{10}$ is preferably an alkyl or aryl group having 1 or more and 12 or less carbon atoms, particularly preferably an alkyl or aryl group having 3 or more and 10 or less carbon atoms. Specific examples of R$^{10}$ include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl, and 2-ethylhexyl groups are particularly preferred.

In the present embodiment, the compound (C-1) can be synthesized by any method without particular limitations and is preferably synthesized by a method of reacting an organic magnesium compound selected from the group consisting of the formulas R$^8$MgX$^1$ and R$^8{}_2$Mg (wherein R$^8$ is as defined above, and X$^1$ represents a halogen atom) with an organic metal compound selected from the group consisting of the formulas M$^2$R$^9{}_k$ and M$^2$R$^9{}_{(k-1)}$H (wherein M$^2$, R$^9$, and k are as defined above) at a temperature of 25° C. or higher and 150° C. or lower in an inert hydrocarbon solvent and, if necessary, subsequently with an alcohol having a hydrocarbon group represented by R$^9$ (wherein R$^9$ is as defined above) or an alkoxy magnesium compound and/or an alkoxy aluminum compound having a hydrocarbon group represented by R$^9$ which is soluble in an inert hydrocarbon solvent.

In the approach of reacting the organic magnesium compound soluble in an inert hydrocarbon solvent with an alcohol, the order in which the compounds are added to the reaction system is not particularly limited. Any of the following methods can be used: the alcohol is added into the organic magnesium compound; the organic magnesium compound is added into the alcohol; and both of the compounds are added at the same time. In the present embodiment, the ratio between the organic magnesium compound soluble in an inert hydrocarbon solvent and the alcohol in the reaction is not particularly limited, and the molar composition ratio g/(γ+δ) of the alkoxy group to all metal atoms in the resulting alkoxy group-containing organic magnesium compound is 0≤g/(γ+δ)≤2, preferably 0≤g/(γ+δ)<1.

Next, the compound (C-2) will be described. The compound (C-2) is a silicon chloride compound having at least one Si—H bond, represented by the formula 4:

(C-2):H$_h$SiCl$_i$R$^{11}{}_{(4-(h+i))}$      Formula 4 wherein R$^{11}$ represents s hydrocarbon group having 1 or more and 12 or less carbon atoms; and h and i each represent a real number that satisfies the following relationships: 0<h, 0<i, and 0<h+i≤4.

In the formula 4, specific examples of the hydrocarbon group represented by R$^{11}$ include, but are not particularly limited to, aliphatic hydrocarbon groups, alicyclic hydrocarbon groups, and aromatic hydrocarbon groups, for example, methyl, ethyl, propyl, 1-methylethyl, butyl, pentyl, hexyl, octyl, decyl, cyclohexyl, and phenyl groups. Among them, alkyl groups having 1 or more and 10 or less carbon atoms are preferred, and alkyl groups having 1 to 3 carbon atoms, such as methyl, ethyl, propyl, and 1-methylethyl group are more preferred. Each of h and i is a number larger than 0 that satisfies the relationship h+i≤4. Preferably, i is 2 or larger and 3 or smaller.

Specific examples of such a compound include, but are not particularly limited to, HSiCl$_3$, HSiCl$_2$CH$_3$, HSiCl$_2$C$_2$H$_5$, HSiCl$_2$ (C$_3$H$_7$), HSiCl$_2$(2-C$_3$H$_7$), HSiCl$_2$ (C$_4$H$_9$), HSiCl$_2$ (C$_6$H$_5$), HSiCl$_2$ (4-Cl—C$_6$H$_4$), HSiCl$_2$ (CH═CH$_2$), HSiCl$_2$ (CH$_2$C$_6$H$_5$), HSiCl$_2$(1-C$_{10}$H$_7$), HSiCl$_2$ (CH$_2$CH═CH$_2$), H$_2$SiCl(CH$_3$), H$_2$SiCl(C$_2$H$_5$), HSiCl(CH$_3$)$_2$, HSiCl(C$_2$H$_5$)$_2$, HSiCl(CH$_3$)(2-C$_3$H$_7$), HSiCl (CH$_3$)(C$_6$H$_5$), and HSiCl(C$_6$H$_5$)$_2$. These silicon chloride compounds are used each alone or as a mixture of two or more types selected from these compounds. Among them, HSiCl$_3$, HSiCl$_2$CH$_3$, HSiCl(CH$_3$)$_2$, and HSiCl$_2$ (C$_3$H$_7$) are preferred, and HSiCl$_3$ and HSiCl$_2$CH$_3$ are more preferred.

Next, the reaction between the compounds (C-1) and (C-2) will be described. For the reaction, the compound (C-2) is preferably used after being diluted in advance with an inert hydrocarbon solvent, a chlorinated hydrocarbon (e.g., 1,2-dichloroethane, o-dichlorobenzene, or dichloromethane), an ether solvent (e.g., diethyl ether or tetrahydrofuran), or a mixed solvent thereof. Among them, an inert hydrocarbon solvent is more preferred in terms of the performance of the catalyst. The ratio between (C-1) and (C-2) in the reaction is not particularly limited and is preferably 0.01 mol or higher and 100 mol or lower, more preferably 0.1 mol or higher and 10 mol or lower, of silicon atom contained in the compound (C-2) with respect to 1 mol of magnesium atom contained in the compound (C-1).

The method for reacting the compounds (C-1) and (C-2) is not particularly limited. Any of the following methods can be used: the compounds (C-1) and (C-2) are reacted while introduced at the same time to a reactor (simultaneous addition method); a reactor is charged with the compound (C-2) in advance, and then, the compound (C-1) is introduced to the reactor; and a reactor is charged with the compound (C-1) in advance, and then, the compound (C-2) is introduced to the reactor. Among them, the method of charging a reactor with the compound (C-2) in advance and then introducing the compound (C-1) to the reactor is preferred. The carrier (C-3) obtained by the reaction is preferably separated by filtration or decantation and then thoroughly washed with an inert hydrocarbon solvent to remove unreacted materials or by-products, etc.

The temperature of the reaction between the compounds (C-1) and (C-2) is not particularly limited and is preferably 25° C. or higher and 150° C. or lower, more preferably 30° C. or higher and 120° C. or lower, further preferably 40° C. or higher and 100° C. or lower. In the simultaneous addition method in which the compounds (C-1) and (C-2) are reacted while introduced at the same time to a reactor, preliminarily setting the temperature of the reactor to a predetermined temperature and adjusting the temperature in the reactor to a predetermined temperature while performing the simultaneous addition are preferred. In the method of charging a reactor with the compound (C-2) in advance and then introducing the compound (C-1) to the reactor, adjusting the temperature of the reactor charged with the silicon chloride compound to a predetermined temperature and adjusting the temperature in the reactor to a predetermined temperature while introducing the organic magnesium compound to the reactor are preferred. In the method of charging a reactor with the compound (C-1) in advance and then introducing the compound (C-2) to the reactor, adjusting the temperature of the reactor charged with the compound (C-1) to a predetermined temperature and adjusting the temperature in the reactor to a predetermined temperature while introducing the compound (C-2) to the reactor are performed.

Next, the organic magnesium compound (C-4) will be described. The compound (C-4) is preferably represented by the formula 5:

$$(C\text{-}4):(M^1)_\alpha(Mg)_\beta(R^2)_a(R^3)_b Y^1_c \quad \text{Formula 5}$$

wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: 0≤α, 0<β, 0≤a, 0≤b, 0≤c, 0<a+b, 0≤c/(α+β)≤2, and nα+2β=a+b+c (wherein n represents the valence of $M^1$).

The amount of the compound (C-4) used is preferably 0.1 or more and 10 or less, more preferably 0.5 or more and 5 or less, in terms of the molar ratio of magnesium atom contained in the compound (C-4) to titanium atom contained in the compound (C-5).

The temperature of the reaction between the compounds (C-4) and (C-5) is not particularly limited and is preferably −80° C. or higher and 150° C. or lower, more preferably −40° C. or higher and 100° C. or lower.

The concentration of the compound (C-4) in use is not particularly limited and is preferably 0.1 mol/L or higher and 2 mol/L or lower, more preferably 0.5 mol/L or higher and 1.5 mol/L or lower, on the basis of titanium atom contained in the compound (C-4). An inert hydrocarbon solvent is preferably used for diluting the compound (C-4).

Next, the compound (C-5) will be described. In the present embodiment, the compound (C-5) is a titanium compound represented by the formula 6:

$$(C\text{-}5):Ti(OR^7)_d X^1_{(4-d)} \quad \text{Formula 6}$$

wherein d represents a real number of 0 or larger and 4 or smaller; $R^7$ represents a hydrocarbon group having 1 or more and 20 or less carbon atoms; and $X^1$ represents a halogen atom.

In the formula 6, d is preferably 0 or larger and 1 or smaller, more preferably 0.

In the formula 6, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Specific examples of the halogen represented by $X^1$ include, but are not particularly limited to, chlorine, bromine, and iodine. Among them, chlorine is preferred. The compound (C-5) selected from these compounds may be used alone, or two or more compounds selected from these compounds may be used as a mixture.

The amount of the compound (C-5) used is not particularly limited and is preferably 0.01 or more and 20 or less, particularly preferably 0.05 or more and 10 or less, in terms of the molar ratio to magnesium atom contained in the carrier (C-3).

The reaction temperature for the compound (C-5) is not particularly limited and is preferably −80° C. or higher and 150° C. or lower, more preferably −40° C. or higher and 100° C. or lower.

The method for allowing the compound (C-5) to be supported by the carrier (C-3) is not particularly limited and may involve reacting an excess of the compound (C-5) with the carrier (C-3) or using a third component to efficiently support the compound (C-5). A method of achieving this supporting through the reaction between the compound (C-5) and the organic magnesium compound (C-4) is preferred.

The order in which the compounds (C-4) and (C-5) are added to the carrier (C-3) is not particularly limited. Any of the following methods can be used: the compound (C-5) is added subsequently to the compound (C-4); the compound (C-4) is added subsequently to the compound (C-5); and the compounds (C-4) and (C-5) are added at the same time. Among them, the method of adding the compounds (C-4) and (C-5) at the same time is preferred. The reaction between the compounds (C-4) and (C-5) is carried out in an inert hydrocarbon solvent, preferably in an aliphatic hydrocarbon solvent such as hexane or heptane. The catalyst thus obtained is used as a slurry solution with an inert hydrocarbon solvent.

Next, the organic metal compound component [B] will be described. The solid catalytic component can serve as a highly active catalyst for polymerization by combination with the organic metal compound component [B]. The organic metal compound component [B] is also called a "promoter." The organic metal compound component [B] is preferably a compound containing a metal selected from the group consisting of groups 1, 2, 12, and 13 of the periodic system, particularly preferably an organic aluminum compound and/or an organic magnesium compound.

Compounds represented by the formula 7 are preferably used each alone or as a mixture as the organic aluminum compound:

$$AlR^{12}_j Z^1_{(3-j)} \quad \text{Formula 7}$$

wherein $R^{12}$ represents a hydrocarbon group having 1 or more and 20 or less carbon atoms; $Z^1$ represents a group selected from the group consisting of hydrogen, halogen, alkoxy, allyloxy, and siloxy groups; and j represents any number of 2 or larger and 3 or smaller.

In the formula 7, specific examples of the hydrocarbon group having 1 or more and 20 or less carbon atoms, represented by $R^{12}$ include, but are not particularly limited to, aliphatic hydrocarbons, aromatic hydrocarbons, and alicyclic hydrocarbons. Preferred examples of such an organic aluminum compound include: trialkyl aluminum compounds such as trimethyl aluminum, triethyl aluminum, tripropyl aluminum, tributyl aluminum, tri(2-methylpropyl) aluminum (or triisobutyl aluminum), tripentyl aluminum, tri(3-methylbutyl)aluminum, trihexyl aluminum, trioctyl aluminum, and tridecyl aluminum; aluminum halide compounds such as diethyl aluminum chloride, ethyl aluminum dichloride, bis(2-methylpropyl)aluminum chloride, ethyl aluminum sesquichloride, and diethyl aluminum bromide; alkoxy aluminum compounds such as diethyl aluminum ethoxide and bis(2-methylpropyl) aluminum butoxide; siloxy aluminum compounds such as dimethylhydrosiloxy aluminum dimethyl, ethylmethylhydrosiloxy aluminum diethyl, and ethyldimethylsiloxy aluminum diethyl; and mixtures thereof. Among them, trialkyl aluminum compounds are particularly preferred.

The organic magnesium compound is preferably an organic magnesium compound represented by the formula 3 which is soluble in an inert hydrocarbon solvent.

Although γ, δ, e, f, g, $M^2$, $R^8$, $R^9$, and $OR^{10}$ in the formula 3 are as already defined, this organic magnesium compound is preferably a compound wherein the ratio δ/γ is 0.5 to 10 and $M^2$ is aluminum because a compound having higher solubility in an inert hydrocarbon solvent is more preferred.

The method for adding the solid catalytic component and the organic metal compound component [B] into a polymerization system placed under polymerization conditions is not particularly limited. These components may be separately added into the polymerization system, or the components may be reacted in advance and then added into the polymerization system. The ratio between the components to be combined is not particularly limited and is preferably 1 mmol or higher and 3,000 mmol or lower of the organic metal compound component [B] with respect to 1 g of the solid catalytic component.

The metallocene catalyst used in the present embodiment is constituted by at least two catalytic components of
a) a transition metal compound having a cyclic η-binding anionic ligand and
b) an activating agent capable of forming a complex that exerts catalytic activity through reaction with the transition metal compound.

The transition metal compound a) having a cyclic η-binding anionic ligand used in the present embodiment can be represented by, for example, the following formula 8:

            Formula 8

$$L_j W_k M X_p X'_q$$

wherein each L independently represents a cyclic η-binding anionic ligand selected from the group consisting of a cyclopentadienyl group, an indenyl group, a tetrahydroindenyl group, a fluorenyl group, a tetrahydrofluorenyl group, and an octahydrofluorenyl group, and this ligand optionally has 1 to 8 substituents, wherein the substituents each independently represent a substituent having 1 to 20 non-hydrogen atoms, selected from the group consisting of hydrocarbon groups having 1 to 20 carbon atoms, halogen atoms, halogen-substituted hydrocarbon groups having 1 to 12 carbon atoms, aminohydrocarbyl groups having 1 to 12 carbon atoms, hydrocarbyloxy groups having 1 to 12 carbon atoms, dihydrocarbylamino groups having 1 to 12 carbon atoms, hydrocarbylphosphino groups having 1 to 12 carbon atoms, a silyl group, an aminosilyl group, hydrocarbyloxysilyl groups having 1 to 12 carbon atoms, and halosilyl groups, M represents a transition metal selected from transition metal groups belonging to group 4 of the periodic system, wherein the formal oxidation number is +2, +3, or +4, and this transition metal is bonded to at least one ligand L via $η^5$ bond, W represents a divalent substituent having 1 to 50 non-hydrogen atoms, and this divalent substituent monovalently binds to each of L and M and thereby forms a metallacycle in collaboration with L and M, Each X independently represents an anionic σ-binding type ligand having 1 to 60 non-hydrogen atoms, selected from the group consisting of a monovalent anionic σ-binding type ligand, a divalent anionic σ-binding type ligand divalently binding to M, and a divalent anionic σ-binding type ligand monovalently binding to each of L and M, Each X' independently represents a neutral Lewis base-coordinating compound having 1 to 40 non-hydrogen atoms, j is 1 or 2 provided that when j is 2, two ligands L are optionally bonded to each other via a divalent group having 1 to 20 non-hydrogen atoms, wherein the divalent group is a group selected from the group consisting of hydrocarbadiyl groups having 1 to 20 carbon atoms, halohydrocarbadiyl groups having 1 to 12 carbon atoms, hydrocarbyleneoxy groups having 1 to 12 carbon atoms, hydrocarbyleneamino groups having 1 to 12 carbon atoms, a silanediyl group, halosilanediyl groups, and a silyleneamino group, k is 0 or 1, p is 0, 1, or 2 provided that: when X is a monovalent anionic σ-binding type ligand or a divalent anionic σ-binding type ligand binding to L and M, p is an integer smaller by at least 1 than the formal oxidation number of M; and when X is a divalent anionic σ-binding type ligand binding only to M, p is an integer smaller by at least (j+1) than the formal oxidation number of M, and q is 0, 1, or 2.

Examples of the ligand X in the compound of the formula 8 include halides, hydrocarbon groups having 1 to 60 carbon atoms, hydrocarbyloxy groups having 1 to 60 carbon atoms, hydrocarbylamide groups having 1 to 60 carbon atoms, hydrocarbyl phosphide groups having 1 to 60 carbon atoms, hydrocarbyl sulfide groups having 1 to 60 carbon atoms, a silyl group, and combinations thereof.

Examples of the neutral Lewis base-coordinating compound X' in the compound of the formula 8 include phosphines, ethers, amines, olefins having 2 to 40 carbon atoms, dienes having 1 to 40 carbon atoms, and divalent groups induced from these compounds.

In the present embodiment, the transition metal compound having a cyclic η-binding anionic ligand is preferably a transition metal compound represented by the formula 8 wherein j=1. Preferred examples of the compound represented by the formula 8 wherein j=1 include compounds represented by the following formula 9:

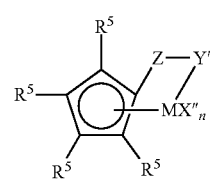

Formula 9

In the formula, M represents a transition metal selected from the group consisting of titanium, zirconium, and hafnium, wherein the formal oxidation number of the transition metal is +2, +3, or +4, Each $R^5$ independently represents a substituent having 1 to 20 non-hydrogen atoms, selected from the group consisting of a hydrogen atom, hydrocarbon groups having 1 to 8 carbon atoms, a silyl group, a germyl group, a cyano group, halogen atoms, and combinations thereof provided that when the substituent $R^5$ is a hydrocarbon group having 1 to 8 carbon atoms, a silyl group, or a germyl group, two adjacent substituents $R^5$ are optionally bonded to each other to form a divalent group, which can form a ring in collaboration with the bond between two carbon atoms of the cyclopentadienyl ring bonded to these two adjacent substituents $R^5$, respectively, Each X" independently represents a substituent having 1 to 20 non-hydrogen atoms, selected from the group consisting of halides, hydrocarbon groups having 1 to 20 carbon atoms, hydrocarbyloxy groups having 1 to 18 carbon atoms, hydrocarbylamino groups having 1 to 18 carbon atoms, a silyl group, hydrocarbylamide groups having 1 to 18 carbon atoms, hydrocarbyl phosphide groups having 1 to 18 carbon atoms, hydrocarbyl sulfide groups having 1 to 18 carbon atoms, and combinations thereof provided that two substituents X″ can optionally form in collaboration a neutral conjugate diene having 4 to 30 carbon atoms or a divalent group, Y′ represents —O—, —S—, —NR²—, or —PR²— wherein R² represents a hydrogen atom, a hydrocarbon group having 1 to 12 carbon atoms, a hydrocarbyloxy group having 1 to 8 carbon atoms, a silyl group, an alkyl halide group having 1 to 8 carbon atoms, an aryl halide group having 6 to 20 carbon atoms, or a combination thereof, Z represents $SiR^3{}_2$, $CR^3{}_2$, $SiR^3{}_2SiR^3{}_2$, $CR^3{}_2CR^3{}_2$, $CR^3=CR^3$, $CR^3{}_2SiR^3{}_2$, or $GeR^3{}_2$ wherein $R^3$ is as defined above, and n is 1, 2, or 3.

Specific examples of the transition metal compound having a cyclic η-binding anionic ligand used in the present embodiment include the following compounds:
bis(methylcyclopentadienyl)zirconium dimethyl,
bis(n-butylcyclopentadienyl)zirconium dimethyl,
bis(indenyl)zirconium dimethyl,
bis(1,3-dimethylcyclopentadienyl)zirconium dimethyl,
(pentamethylcyclopentadienyl)(cyclopentadienyl)zirconium dimethyl,
bis(cyclopentadienyl)zirconium dimethyl,
bis(pentamethylcyclopentadienyl)zirconium dimethyl,
bis(fluorenyl)zirconium dimethyl,
ethylenebis(indenyl)zirconium dimethyl,
ethylenebis(4,5,6,7-tetrahydro-1-indenyl)zirconium dimethyl,
ethylenebis(4-methyl-1-indenyl)zirconium dimethyl,
ethylenebis(5-methyl-1-indenyl)zirconium dimethyl,
ethylenebis(6-methyl-1-indenyl)zirconium dimethyl,
ethylenebis(7-methyl-1-indenyl)zirconium dimethyl,
ethylenebis(5-methoxy-1-indenyl)zirconium dimethyl,
ethylenebis(2,3-dimethyl-1-indenyl)zirconium dimethyl,
ethylenebis(4,7-dimethyl-1-indenyl)zirconium dimethyl,
ethylenebis-(4,7-dimethoxy-1-indenyl)zirconium dimethyl,
methylenebis(cyclopentadienyl)zirconium dimethyl,
isopropylidene(cyclopentadienyl)zirconium dimethyl,
isopropylidene(cyclopentadienyl-fluorenyl)zirconium dimethyl,
silylenebis(cyclopentadienyl)zirconium dimethyl,
dimethylsilylene(cyclopentadienyl)zirconium dimethyl,
[(N-t-butylamido)(tetramethyl-η5-cyclopentadienyl)-1,2-ethanediyl]titanium dimethyl,
[(N-t-butylamido)(tetramethyl-η5-cyclopentadienyl)dimethylsilane]titanium dimethyl,
[(N-methylamido)(tetramethyl-η5-cyclopentadienyl)dimethylsilane]titanium dimethyl,
[(N-phenylamido)(tetramethyl-η5-cyclopentadienyl)dimethylsilane]titanium dimethyl,
[(N-benzylamido)(tetramethyl-η5-cyclopentadienyl)dimethylsilane]titanium dimethyl,
[(N-t-butylamido)(η5-cyclopentadienyl)-1,2-ethanediyl]titanium dimethyl,
[(N-t-butylamido)(η5-cyclopentadienyl)dimethylsilane]titanium dimethyl,
[(N-methylamido)(η5-cyclopentadienyl)-1,2-ethanediyl]titanium dimethyl,
[(N-methylamido)(η5-cyclopentadienyl)dimethylsilane]titanium dimethyl,
[(N-t-butylamido)(η5-indenyl)dimethylsilane]titanium dimethyl,
[(N-benzylamido)(η5-indenyl)dimethylsilane]titanium dimethyl,
dibromobistriphenylphosphine nickel,
dichlorobistriphenylphosphine nickel,
dibromodiacetonitrile nickel,
dibromodibenzonitrile nickel,
dibromo(1,2-bisdiphenylphosphinoethane)nickel,
dibromo(1,3-bisdiphenylphosphinopropane)nickel,
dibromo(1,1′-diphenylbisphosphinoferrocene)nickel,
dimethylbisdiphenylphosphine nickel,
dimethyl(1,2-bisdiphenylphosphinoethane)nickel,
methyl(1,2-bisdiphenylphosphinoethane)nickel tetrafluoroborate,
(2-diphenylphosphino-1-phenylethyleneoxy)phenylpyridine nickel,
dichlorobistriphenylphosphine palladium,
dichlorodibenzonitrile palladium,
dichlorodiacetonitrile palladium,
dichloro(1,2-bisdiphenylphosphinoethane)palladium,
bistriphenylphosphine palladium bistetrafluoroborate, and
bis(2,2′-bipyridine)methyl iron tetrafluoroborate etherate.

Specific examples of the transition metal compound having a cyclic η-binding anionic ligand used in the present embodiment further include compounds named by the replacement of the moiety "dimethyl" (which appears at the end of the name of each compound, i.e., immediately after the moiety "zirconium" or "titanium", and corresponds to the moiety of X″ in the formula 9) in the name of each zirconium compound or titanium compound listed above with, for example, any of the following:
"dichloro",
"dibromo",
"diiodo",
"diethyl",
"dibutyl",
"diphenyl",
"dibenzyl",
"2-(N,N-dimethylamino)benzyl",
"2-butene-1,4-diyl",
"s-trans-η4-1,4-diphenyl-1,3-butadiene",
"s-trans-η4-3-methyl-1,3-pentadiene",
"s-trans-η4-1,4-dibenzyl-1,3-butadiene",
"s-trans-η4-2,4-hexadiene",
"s-trans-η4-1,3-pentadiene",
"s-trans-η4-1,4-ditolyl-1,3-butadiene",
"s-trans-η4-1,4-bis(trimethylsilyl)-1,3-butadiene",
"s-cis-η4-1,4-diphenyl-1,3-butadiene",
"s-cis-η4-3-methyl-1,3-pentadiene",
"s-cis-η4-1,4-dibenzyl-1,3-butadiene",
"s-cis-η4-2,4-hexadiene",
"s-cis-η4-1,3-pentadiene",
"s-cis-η4-1,4-ditolyl-1,3-butadiene", and
"s-cis-η4-1,4-bis(trimethylsilyl)-1,3-butadiene".

The transition metal compound having a cyclic η-binding anionic ligand used in the present embodiment can be synthesized by a method generally known in the art. These transition metal compounds may be used alone or in combination.

Next, the activating agent capable of forming a complex that exerts catalytic activity through reaction with the transition metal compound (also simply referred to as an "activating agent" in the present embodiment) used in the present embodiment will be described.

Examples of the activating agent according to the present embodiment include compounds represented by the following formula 10:

$$[L-H]^{d+}[M_mQ_p]^{d-} \quad \text{Formula 10}$$

wherein [L-H]$^{d+}$ represents a proton-donating Bronsted acid wherein L represents a neutral Lewis base, and d represents an integer of 1 to 7; and [M$_m$Q$_p$]$^{d-}$ represents a compatible non-coordinating anion wherein M represents a metal belonging to any of groups 5 to 15 of the periodic system, or a metalloid, each Q is independently selected from the group consisting of hydrides, halides, dihydrocarbylamide groups having 2 to 20 carbon atoms, hydrocarbyloxy groups having 1 to 30 carbon atoms, hydrocarbon groups having 1 to 30 carbon atoms, and substituted hydrocarbon groups having 1 to 40 carbon atoms wherein the number of the halide represented by each Q independently selected in the formula 10 is 0 or 1, m represents an integer of 1 to 7, p represents an integer of 2 to 14, and d is as defined above provided that p−m=d.

Specific examples of the non-coordinating anion include, but are not particularly limited to, the following compounds:
tetrakisphenyl borate,
tri(p-tolyl)(phenyl)borate,
tris(pentafluorophenyl)(phenyl)borate,
tris(2,4-dimethylphenyl)(phenyl)borate,
tris(3,5-dimethylphenyl)(phenyl)borate,
tris(3,5-di-trifluoromethylphenyl)(phenyl)borate,
tris(pentafluorophenyl)(cyclohexyl)borate,
tris(pentafluorophenyl)(naphthyl)borate,
tetrakis(pentafluorophenyl)borate,
triphenyl(hydroxyphenyl)borate,
diphenyl-di(hydroxyphenyl)borate,
triphenyl(2,4-dihydroxyphenyl)borate,
tri(p-tolyl)(hydroxyphenyl)borate,
tris(pentafluorophenyl)(hydroxyphenyl)borate,
tris(2,4-dimethylphenyl)(hydroxyphenyl)borate,
tris(3,5-dimethylphenyl)(hydroxyphenyl)borate,
tris(3,5-di-trifluoromethylphenyl)(hydroxyphenyl)borate,
tris(pentafluorophenyl)(2-hydroxyethyl)borate,
tris(pentafluorophenyl)(4-hydroxybutyl)borate,
tris(pentafluorophenyl)(4-hydroxy-cyclohexyl)borate,
tris(pentafluorophenyl)(4-(4'-hydroxyphenyl)phenyl)borate, and
tris(pentafluorophenyl)(6-hydroxy-2-naphthyl)borate.

Other preferred examples of the non-coordinating anion include borates derived from the borates listed above by the replacement of the hydroxy group with a NHR group wherein R is preferably a methyl group, an ethyl group, or a tert-butyl group.

Examples of the proton-donating Bronsted acid include, but are not particularly limited to: trialkyl group-substituted ammonium cations such as triethylammonium, tripropylammonium, tri(n-butyl)ammonium, trimethylammonium, tributylammonium, and tri(n-octyl)ammonium. Also, N,N-dialkylanilinium cations such as N,N-dimethylanilinium, N,N-diethylanilinium, N,N-2,4,6-pentamethylanilinium, and N,N-dimethylbenzylanilinium are preferred.

In addition, dialkylammonium cations such as di-(i-propyl)ammonium and dicyclohexylammonium are preferred. Triarylphosphonium cations such as triphenylphosphonium, tri(methylphenyl)phosphonium, and tri(dimethylphenyl)phosphonium, and dimethylsulfonium, diethylsulfonium, and diphenylsulfonium, etc., are also preferred.

In the present embodiment, an organic metal oxy compound having unit represented by the following formula 11 may be used as the activating agent:

$$-(M^2R_{n-2}-O)_m-$$ Formula 11 wherein M$^2$ represents a metal belonging to any of groups 13 to 15 of the periodic system, or a metalloid, each R independently represents a hydrocarbon group having 1 to 12 carbon atoms or a substituted hydrocarbon group, n represents the valence of the metal M$^2$, and m represents an integer of 2 or larger.

As a preferred example, the activating agent of the present embodiment is, for example, an organic aluminum oxy compound comprising a unit represented by the following formula 12:

$$-(AlR-O)_m-$$ Formula 12 wherein R represents an alkyl group having 1 to 8 carbon atoms, and m represents an integer of 2 to 60.

As a more preferred example, the activating agent of the present embodiment is, for example, a methylaluminoxane comprising a unit represented by the following formula 13:

$$-[Al(CH_3)-O]_m-$$ Formula 13 wherein m represents an integer of 2 to 60.

In the present embodiment, these activating agent components may be used alone or in combination.

In the present embodiment, such a catalytic component may be used as a supported catalyst in which the component is supported by a solid component. Such a solid component is, for example, at least one inorganic solid material selected from: porous polymer materials such as polyethylene, polypropylene, and styrene-divinylbenzene copolymers; inorganic solid materials having an element belonging to any of groups 2, 3, 4, 13, and 14 of the periodic system, such as silica, alumina, magnesia, magnesium chloride, zirconia, titania, boron oxide, calcium oxide, zinc oxide, barium oxide, vanadium pentaoxide, chromium oxide, and thorium oxide, and mixtures thereof; and complex oxides thereof. Such complex oxides of silica are, for example, complex oxides of silica and an element of group 2 or 13 of the periodic system, such as silica-magnesia and silica-alumina.

In addition to the two catalytic components mentioned above, an organic aluminum compound can be used, if necessary, as a catalytic component. The organic aluminum compound that can be used in the present embodiment is, for example, a compound represented by the following formula 14:

$$AlR_nX_{3-n}$$ Formula 14 wherein R represents an alkyl group having 1 to 12 carbon atoms or an aryl group having 6 to 20 carbon atoms, X represents halogen, hydrogen, or an alkoxyl group, wherein the alkyl group is linear, branched, or cyclic, and n represents an integer of 1 to 3.

The organic aluminum compound of the present embodiment may be a mixture of compounds represented by the general formula 14. Examples of R in the general formula include a methyl group, an ethyl group, a butyl group, an isobutyl group, a hexyl group, an octyl group, a decyl group, a phenyl group, and a tolyl group. Examples of X in the formula include a methoxy group, an ethoxy group, a butoxy group, and chloro.

Examples of the organic aluminum compound used in the present embodiment include, but are not particularly limited to, trimethyl aluminum, triethyl aluminum, tributyl aluminum, triisobutyl aluminum, trihexyl aluminum, trioctyl aluminum, tridecyl aluminum, diethyl aluminum hydride, dibutyl aluminum hydride, and diisobutyl aluminum hydride. Alternatively, a mixture thereof may be used. Alternative examples of the organic aluminum compound that can be used in the present embodiment include reaction products of these organic aluminums and alcohols such as methyl alcohol, ethyl alcohol, butyl alcohol, pentyl alcohol, hexyl alcohol, octyl alcohol, and decyl alcohol, for example, dimethyl methoxy aluminum, dimethyl ethoxy aluminum, and dibutyl butoxy aluminum.

For the preparation of the metallocene catalyst used in the present embodiment, the stirring rate in the reactor in which a carrier for the catalyst, the transition metal compound component, and the activating agent are mixed is important from the viewpoint of controlling the particle size of the catalyst. The stirring rate is preferably 30 rpm or higher and 300 rpm or lower. The stirring rate of 30 rpm or higher can prevent the catalyst from having too coarse a particle size or from aggregating. The stirring rate of 300 rpm or lower can prevent the carrier from being destroyed or the catalyst from having too fine a particle size. The particle size of the catalyst is reflected to the particle size of the finally produced polyethylene powder and is therefore very important to manage.

Next, a hydrogenating agent that is used at the same time with the metallocene catalyst will be described.

Examples of the hydrogenating agent include hydrogen and compounds represented by $R_{r-n}(M_t)\alpha H_n$ (wherein $M_t$ represents an atom belonging to groups 1 to 3, 14, and 15 of the periodic system, R represents a hydrocarbon group selected from the group consisting of alkyl groups having 1 to 4 carbon atoms, aryl groups having 6 to 12 carbon atoms, alkylaryl groups having 7 to 20 carbon atoms, arylalkyl groups having 7 to 20 carbon atoms, and alkenyl groups having 2 to 20 carbon atoms, n>0, r−n≥0, and r represents the valence of $M_t$).

Among them, hydrogen or a silane compound represented by $R_n SiH_{4-n}$ (wherein 0≤n≤1, and R represents a hydrocarbon group selected from the group consisting of alkyl groups having 1 to 4 carbon atoms, aryl groups having 6 to 12 carbon atoms, alkylaryl groups having 7 to 20 carbon atoms, arylalkyl groups having 7 to 20 carbon atoms, and alkenyl groups having 2 to 20 carbon atoms) is preferred, and hydrogen is particularly preferred.

Examples of the hydrogenating agent include, but are not particularly limited to, hydrogen, sodium hydride, calcium hydride, lithium aluminum hydride, SiH4, methylsilane, ethylsilane, n-butylsilane, octylsilane, octadecylsilane, phenylsilane, benzylsilane, dimethylsilane, diethylsilane, di-n-butylsilane, dioctylsilane, dioctadecylsilane, diphenylsilane, dibenzylsilane, ethenylsilane, 3-butenylsilane, 5-hexenylsilane, cyclohexenylsilane, 7-octenylsilane, and 17-octadecenylsilane. Hydrogen, octylsilane, or phenylsilane is preferred.

In the present embodiment, these hydrogenating agents may be used alone or may be used in combination.

The metallocene catalyst is contacted with the hydrogenating agent in advance and then used in polymerization. Examples of the method for contacting the metallocene catalyst with the hydrogenating agent before introduction to a polymerization reactor include:
1) a method which involves allowing a vehicle for catalyst transfer to contain the hydrogenating agent, and contacting the catalyst with the hydrogenating agent while transferring the catalyst to a polymerization reactor; and
2) a method which involves introducing the hydrogenating agent at a stage preceding catalyst transfer, for example, to a catalyst reservoir or the like, and contacting the catalyst with the hydrogenating agent.

In the method 1), for example, a hydrogenating agent supply line is connected to a catalyst transfer line disposed for introducing the catalyst to a polymerization reactor, and the hydrogenating agent is supplied to the line so that the vehicle can contain the hydrogenating agent. Alternatively, a hydrogenating agent supply line is connected to a catalyst supply nozzle disposed within a polymerization reactor for introducing the catalyst to the polymerization reactor, and the hydrogenating agent is supplied to the line so that the vehicle can contain the hydrogenating agent. Also, the vehicle for the transfer of the catalyst to a polymerization reactor can be allowed in advance to contain the hydrogenating agent, and the catalyst may be transferred to a polymerization reactor using the hydrogenating agent-containing vehicle for catalyst transfer.

In the method 2), the contact time is not particularly limited and is preferably within 10 minutes, more preferably within 5 minutes, further preferably within 1 minute, still further preferably within 30 seconds, most preferably within 20 seconds.

In the present embodiment, the amount of the hydrogenating agent contacted with the metallocene catalyst is 0.5 times or more and 50000 times or less the mol of the transition metal compound contained in the catalyst. If the amount of the hydrogenating agent is less than 0.5 times the mol thereof, polymer clumps are generated to make stable operation difficult. If the amount of the hydrogenating agent is more than 50000 times the mol thereof, polymerization activity and a molecular weight may be reduced. The amount of the hydrogenating agent is preferably 1 time or more and 30000 times or less, more preferably 10 times or more and 1000 times or less the mol of the transition metal compound.

Next, a compound having hydrogenation ability used in the present embodiment will be described. The compound having hydrogenation ability is a compound capable of hydrogenating ethylene or the α-olefin in the system through reaction with hydrogen, resulting in reduction in hydrogen concentration within the polymerization reactor, and is preferably a compound that does not reduce polymerization catalytic activity. A metallocene compound or a compound containing platinum, palladium, palladium-chromium, nickel, or ruthenium can be used. Among them, a metallocene compound having high hydrogenation activity is preferred, and a titanocene compound or a half titanocene compound that can exert hydrogenation activity around the polymerization temperature is particularly preferred.

The titanocene compound or the half titanocene compound has hydrogenation activity in itself and is preferably mixed and reacted with an organic metal compound such as organic lithium, organic magnesium, or organic aluminum to thereby enhance the hydrogenation activity.

The mixing and reaction between the organic metal compound and the titanocene compound or the half titanocene compound may be carried out before feed into the polymerization reactor or may be carried out in the polymerization reactor separately fed with these compound.

The titanocene compound or the half titanocene compound used in the present embodiment can be represented by, for example, the following formula 15:

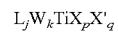           Formula 15 wherein each L independently represents a cyclic η-binding anionic ligand selected from the group consisting of a cyclopentadienyl group, an indenyl group, a tetrahydroindenyl group, a fluorenyl group, a tetrahydrofluorenyl group, and an octahydrofluorenyl group, and this ligand optionally has 1 to 8 substituents, wherein the substituents are each independently a substituent having 1 to 20 non-hydrogen atoms, selected from the group consisting of hydrocarbon groups having 1 to 20 carbon atoms, halogen atoms, halogen-substituted hydrocarbon groups having 1 to 12 carbon atoms, aminohydrocarbyl groups having 1 to 12 carbon atoms, hydrocarbyloxy groups having 1 to 12 carbon atoms, dihydrocarbylamino groups having 1 to 12 carbon atoms, hydrocarbylphosphino groups having 1 to 12 carbon atoms, a silyl group, an aminosilyl group, hydrocarbyloxysilyl groups having 1 to 12 carbon atoms, and halosilyl groups, Ti represents titanium, wherein the formal oxidation number is +2, +3, or +4, and this titanium is bonded to at least one ligand L via $\eta^5$ bond, W represents a divalent substituent having 1 to 50 non-hydrogen atoms, and this divalent substituent monovalently binds to each of L and Ti and thereby forms a metallacycle in collaboration with L and Ti, X and X' each independently represent a ligand selected from the group consisting of a monovalent ligand, a divalent ligand that divalently binds to Ti, and a divalent ligand that monovalently binds to each of L and Ti, and this ligand is a hydrogen atom or a ligand having 1 to 20 non-hydrogen atoms, selected from the group consisting of hydrocarbon groups having 1 to 20 carbon atoms, halogen atoms, halogen-substituted hydrocarbon groups having 1 to 12 carbon atoms, aminohydrocarbyl groups having 1 to 12 carbon atoms, hydrocarbyloxy groups having 1 to 12 carbon atoms, dihydrocarbylamino groups having 1 to 12 carbon atoms, hydrocarbylphosphino groups having 1 to 12 carbon atoms, a silyl group, an aminosilyl group, hydrocarbyloxysilyl groups having 1 to 12 carbon atoms, and halosilyl groups, j is 1 or 2 provided that when j is 2, two ligands L are optionally bonded to each other via a divalent group having up to 20 non-hydrogen atoms, wherein the divalent group is a group selected from the group consisting of hydrocarbadiyl groups having 1 to 20 carbon atoms, halohydrocarbadiyl groups having 1 to 12 carbon atoms, hydrocarbyleneoxy groups having 1 to 12 carbon atoms, hydrocarbyleneamino groups having 1 to 12 carbon atoms, a silanediyl group, halosilanediyl groups, and a silyleneamino group, k is 0 or 1, p is 0, 1, or 2 provided that: when X is a monovalent ligand or a divalent ligand binding to L and Ti, p is an integer smaller by at least 1 than the formal oxidation number of Ti; and when X is a divalent anionic σ-binding type ligand binding only to Ti, p is an integer smaller by at least (j+1) than the formal oxidation number of Ti, and q is 0, 1, or 2.

When the cyclic η-binding anionic ligand is a cyclopentadienyl group, specific examples of the titanocene compound used in the present embodiment include the following compounds:
bis(cyclopentadienyl)titanium dimethyl,
bis(cyclopentadienyl)titanium diethyl,
bis(cyclopentadienyl)titanium diisopropyl,
bis(cyclopentadienyl)titanium di-n-butyl,
bis(cyclopentadienyl)titanium di-sec-butyl,
bis(cyclopentadienyl)titanium dihexyl,
bis(cyclopentadienyl)titanium dioctyl,
bis(cyclopentadienyl)titanium dimethoxide,
bis(cyclopentadienyl)titanium diethoxide,
bis(cyclopentadienyl)titanium diisopropoxide,
bis(cyclopentadienyl)titanium dibutoxide,
bis(cyclopentadienyl)titanium diphenyl,
bis(cyclopentadienyl)titanium di-m-tolyl,
bis(cyclopentadienyl)titanium di-p-tolyl,
bis(cyclopentadienyl)titanium di-m,p-xylyl,
bis(cyclopentadienyl)titanium di-4-ethylphenyl,
bis(cyclopentadienyl)titanium di-4-hexylphenyl,
bis(cyclopentadienyl)titanium di-4-methoxyphenyl,
bis(cyclopentadienyl)titanium di-4-ethoxyphenyl,
bis(cyclopentadienyl)titanium diphenoxide,
bis(cyclopentadienyl)titanium difluoride,
bis(cyclopentadienyl)titanium dibromide,
bis(cyclopentadienyl)titanium dichloride,
bis(cyclopentadienyl)titanium dibromide,
bis(cyclopentadienyl)titanium diiodide,
bis(cyclopentadienyl)titanium chloride methyl,
bis(cyclopentadienyl)titanium chloride ethoxide,
bis(cyclopentadienyl)titanium chloride phenoxide,
bis(cyclopentadienyl)titanium dibenzyl,
bis(cyclopentadienyl)titanium di-dimethylamide,
bis(cyclopentadienyl)titanium di-diethylamide,
bis(cyclopentadienyl)titanium di-diisopropylamide,
bis(cyclopentadienyl)titanium di-sec-butylamide,
bis(cyclopentadienyl)titanium di-tert-butylamide, and
bis(cyclopentadienyl)titanium di-ditrimethylsilylamide.

Specific examples of the titanocene compound used in the present embodiment further include compounds named by the replacement of the moiety "cyclopentadienyl" listed above with any of the following cyclic η-binding anionic ligands:
"methylcyclopentadienyl",
"n-butylcyclopentadienyl",
"1,3-dimethylcyclopentadienyl",
"pentamethylcyclopentadienyl",
"tetramethylcyclopentadienyl",
"trimethylsilylcyclopentadienyl",
"1,3-bistrimethylsilylcyclopentadienyl",
"indenyl",
"4,5,6,7-tetrahydro-1-indenyl",
"5-methyl-1-indenyl",
"6-methyl-1-indenyl",
"7-methyl-1-indenyl",
"5-methoxy-1-indenyl",
"2,3-dimethyl-1-indenyl",
"4,7-dimethyl-1-indenyl",
"4,7-dimethoxy-1-indenyl", and
"fluorenyl".

Any combination of the ligands described above can be used as the two cyclic η-binding anionic ligands constituting the titanocene compound. Specific examples of the compound in which these ligands are arbitrarily combined include the following compounds:
(pentamethylcyclopentadienyl)(cyclopentadienyl)titanium dichloride,
(fluorenyl)(cyclopentadienyl)titanium dichloride,
(fluorenyl)(pentamethylcyclopentadienyl)titanium dichloride,
(indenyl)(cyclopentadienyl)titanium dichloride,
(indenyl)(pentamethylcyclopentadienyl)titanium dichloride,
(indenyl)(fluorenyl)titanium dichloride,
(tetrahydroindenyl)(cyclopentadienyl)titanium dichloride,
(tetrahydroindenyl)(pentamethylcyclopentadienyl)titanium dichloride,
(tetrahydroindenyl)(fluorenyl)titanium dichloride,
(cyclopentadienyl)(1,3-bistrimethylsilylcyclopentadienyl)titanium dichloride,
(pentamethylcyclopentadienyl)(1,3-bistrimethylsilylcyclopentadienyl)titanium dichloride,
(fluorenyl)(1,3-bistrimethylsilylcyclopentadienyl)titanium dichloride,
(indenyl)(1,3-bistrimethylsilylcyclopentadienyl)titanium dichloride, and
(tetrahydroindenyl)(1,3-bistrimethylsilylcyclopentadienyl)titanium dichloride.

Further examples thereof include compounds named by the replacement of the moiety "dichloride" in each of these compounds with any of the following:
"dibromide",
"diiodide",
"methyl chloride",
"methyl bromide",
"dimethyl",
"diethyl",
"dibutyl",
"diphenyl",
"dibenzyl",
"dimethoxy",
"methoxy chloride",
"bis-2-(N,N-dimethylamino)benzyl",
"2-butene-1,4-diyl",
"s-trans-η4-1,4-diphenyl-1,3-butadiene",
"s-trans-η4-3-methyl-1,3-pentadiene",
"s-trans-η4-1,4-dibenzyl-1,3-butadiene",
"s-trans-η4-2,4-hexadiene",
"s-trans-η4-1,3-pentadiene",
"s-trans-η4-1,4-ditolyl-1,3-butadiene",
"s-trans-η4-1,4-bis(trimethylsilyl)-1,3-butadiene",
"s-cis-η4-1,4-diphenyl-1,3-butadiene",
"s-cis-η4-3-methyl-1,3-pentadiene",
"s-cis-η4-1,4-dibenzyl-1,3-butadiene",
"s-cis-η4-2,4-hexadiene",
"s-cis-η4-1,3-pentadiene",
"s-cis-η4-1,4-ditolyl-1,3-butadiene", and
"s-cis-η4-1,4-bis(trimethylsilyl)-1,3-butadiene".

These two cyclic η-binding anionic ligands may be bonded via any of the following groups: —SiR*$_2$—, —CR*$_2$—, —SiR*$_2$SiR*$_2$—, —CR*$_2$CR*$_2$—, —CR*=CR—, —CR*$_2$SiR*$_2$—, —GeR*$_2$—, etc., wherein R* represents a hydrogen atom, a hydrocarbon group having 1 to 12 carbon atoms, a hydrocarbyloxy group having 1 to 8 carbon atoms, a silyl group, an alkyl halide group having 1 to 8 carbon atoms, an aryl halide group having 6 to 20 carbon atoms, or a complex group thereof.

Specific examples of the two cyclic η-binding anionic ligands bonded include the following compounds:
ethylenebis(cyclopentadienyl)titanium dichloride,
ethylenebis(tetramethylcyclopentadienyl)titanium dichloride,
ethylenebis(indenyl)titanium dichloride,
ethylenebis(4,5,6,7-tetrahydro-1-indenyl)titanium dichloride,
ethylenebis(4-methyl-1-indenyl)titanium dichloride,
ethylenebis(5-methyl-1-indenyl)titanium dichloride,
ethylenebis(6-methyl-1-indenyl)titanium dichloride,
ethylenebis(7-methyl-1-indenyl)titanium dichloride,
ethylenebis(5-methoxy-1-indenyl)titanium dichloride,
ethylenebis(2,3-dimethyl-1-indenyl)titanium dichloride,
ethylenebis(4,7-dimethyl-1-indenyl)titanium dichloride,
ethylenebis(4,7-dimethoxy-1-indenyl)titanium dichloride,
methylenebis(cyclopentadienyl)titanium dichloride,
isopropylidenebis(cyclopentadienyl)titanium dichloride,
isopropylidene(cyclopentadienyl)(fluorenyl)titanium dichloride,
silylenebis(cyclopentadienyl)titanium dichloride,
dimethylsilylenebis(cyclopentadienyl)titanium dichloride,
dimethylsilylenebis(tetramethylcyclopentadienyl)titanium dichloride,
dimethylsilylenebis(methylcyclopentadienyl)titanium dichloride,
dimethylsilylenebis(trimethylsilylcyclopentadienyl)titanium dichloride,
dimethylsilylene(cyclopentadienyl)(fluorenyl)titanium dichloride,
dimethylsilylene(cyclopentadienyl)(indenyl)titanium dichloride,
dimethylsilylene(tetramethylcyclopentadienyl)(fluorenyl)titanium dichloride,
dimethylsilylene(tetramethylcyclopentadienyl)(indenyl)titanium dichloride,
dimethylsilylene(tetramethylcyclopentadienyl)(cyclopentadienyl)titanium dichloride,
dimethylsilylene(fluorenyl)(indenyl)titanium dichloride,
dimethylsilylene(tetramethylcyclopentadienyl)(trimethylsilylcyclopentadienyl)titanium dichloride,
dimethylsilylene(tetramethylcyclopentadienyl)(3,5-bistrimethylsilylcyclopentadienyl)titanium dichloride,
dimethylsilylene(cyclopentadienyl)(trimethylsilylcyclopentadienyl)titanium dichloride,
dimethylsilylene(tetramethylcyclopentadienyl)(3,5-bistrimethylsilylcyclopentadienyl)titanium dichloride,
dimethylsilylene(fluorenyl)(trimethylsilylcyclopentadienyl)titanium dichloride,
dimethylsilylene(fluorenyl)(3,5-bistrimethylsilylcyclopentadienyl)titanium dichloride,
dimethylsilylene(indenyl)(trimethylsilylcyclopentadienyl)titanium dichloride, and
dimethylsilylene(indenyl)(3,5-bistrimethylsilylcyclopentadienyl)titanium dichloride.

When the cyclic η-binding anionic ligand is a cyclopentadienyl group, specific examples of the half titanocene compound used in the present embodiment include the following compounds:
cyclopentadienyl titanium trimethyl,
cyclopentadienyl titanium triethyl,
cyclopentadienyl titanium triisopropyl,
cyclopentadienyl titanium tri-n-butyl,
cyclopentadienyl titanium tri-sec-butyl,
cyclopentadienyl titanium trimethoxide,
cyclopentadienyl titanium triethoxide,
cyclopentadienyl titanium triisopropoxide,
cyclopentadienyl titanium tributoxide,
cyclopentadienyl titanium triphenyl,
cyclopentadienyl titanium tri-m-tolyl,
cyclopentadienyl titanium tri-p-tolyl,
cyclopentadienyl titanium tri-m,p-xylyl,
cyclopentadienyl titanium tri-4-ethylphenyl,
cyclopentadienyl titanium tri-4-hexylphenyl,
cyclopentadienyl titanium tri-4-methoxyphenyl,
cyclopentadienyl titanium tri-4-ethoxyphenyl,
cyclopentadienyl titanium triphenoxide,
cyclopentadienyl titanium trifluoride,
cyclopentadienyl titanium tribromide,
cyclopentadienyl titanium trichloride,
cyclopentadienyl titanium tribromide,
cyclopentadienyl titanium triiodide,
cyclopentadienyl titanium methyl dichloride,
cyclopentadienyl titanium dimethyl chloride,
cyclopentadienyl titanium ethoxide dichloride,
cyclopentadienyl titanium diethoxide chloride,
cyclopentadienyl titanium phenoxide dichloride,
cyclopentadienyl titanium diphenoxide chloride,
cyclopentadienyl titanium tribenzyl,
cyclopentadienyl titanium tri-dimethylamide,
cyclopentadienyl titanium tri-diethylamide,
cyclopentadienyl titanium tri-diisopropylamide,
cyclopentadienyl titanium tri-di-sec-butylamide,
cyclopentadienyl titanium tri-di-tert-butylamide, and
cyclopentadienyl titanium tri-ditrimethylsilylamide.

Specific examples of the half titanocene compound used in the present embodiment further include compounds named by the replacement of the moiety "cyclopentadienyl" listed above with any of the same cyclic η-binding anionic ligands as those listed in the specific examples of the titanocene compound. Further examples of the half titanocene compound include the following compounds:

[(N-tert-butylamido)(tetramethylcyclopentadienyl)-1,2-ethanediyl]titanium dichloride,
[(N-tert-butylamido) (tetramethylcyclopentadienyl)dimethylsilane]titanium dichloride,
[(N-methylamido) (tetramethylcyclopentadienyl)dimethylsilane]titanium dichloride,
[(N-phenylamido) (tetramethylcyclopentadienyl)dimethylsilane]titanium dichloride,
[(N-benzylamido) (tetramethylcyclopentadienyl)dimethylsilane]titanium dichloride,
[(N-tert-butylamido)(cyclopentadienyl)-1,2-ethanediyl]titanium dichloride,
[(N-tert-butylamido) (cyclopentadienyl)dimethylsilane]titanium dichloride,
[(N-methylamido)(cyclopentadienyl)-1,2-ethanediyl]titanium dichloride,
[(N-methylamido)(cyclopentadienyl)dimethylsilane]titanium dichloride,
[(N-tert-butylamido)(indenyl)dimethylsilane]titanium dichloride, and
[(N-benzylamido)(indenyl)dimethylsilane]titanium dichloride.

Further examples thereof include compounds named by the replacement of the moiety "dichloride" in each of these half titanocene compounds with any of those listed for the titanocene compound. These titanocene compounds or half titanocene compounds can be used alone or in combination. Among them, a preferred compound having high hydrogenation activity is
bis(cyclopentadienyl)titanium dichloride,
bis(cyclopentadienyl)titanium di-m-tolyl, or
bis(cyclopentadienyl)titanium di-p-tolyl.

The titanocene compound or the half titanocene compound can be preferably mixed and reacted with organic lithium, organic magnesium, or organic aluminum to thereby further enhance hydrogenation activity.

Examples of the organic lithium that may be mixed and reacted with the titanocene compound or the half titanocene compound include compounds represented by RLi (wherein R represents a hydrocarbon group selected from the group consisting of alkyl groups, alkoxy groups, or alkylamide groups having 1 to 10 carbon atoms, aryl groups, aryloxy groups, or arylamide groups having 6 to 12 carbon atoms, alkylaryl groups, alkylaryloxy groups, or alkylarylamide groups having 7 to 20 carbon atoms, arylalkyl groups, arylalkoxy groups, or arylalkylamide groups having 7 to 20 carbon atoms, and alkenyl groups having 2 to 20 carbon atoms).

Examples of such organic lithium include, but are not particularly limited to, monolithium compounds such as methyl lithium, ethyl lithium, isopropyl lithium, n-butyl lithium, sec-butyl lithium, tert-butyl lithium, methoxy lithium, ethoxy lithium, isopropoxy lithium, butoxy lithium, dimethylamide lithium, diethylamide lithium, diisopropylamide lithium, dibutylamide lithium, diphenylamide lithium, phenyl lithium, m-tolyl lithium, p-tolyl lithium, xylyl lithium, methoxyphenyl lithium, phenoxy lithium, 4-methylphenoxy lithium, 2,6-diisopropylphenoxy lithium, 2,4,6-triisopropylphenoxy lithium, and benzyl lithium.

Further examples thereof include oligomers having terminal living activity to which a small amount of a monomer has been added with any of the monolithium compounds as an initiator, for example, polybutadienyl lithium, polyisoprenyl lithium, and polystyryl lithium. Further examples thereof include compounds having two or more lithium atoms in one molecule, for example, a dilithium compound which is a reaction product of diisopropenylbenzene and sec-butyl lithium, and a multi-lithium compound which is a reaction product of divinylbenzene, sec-butyl lithium, and a small amount of 1,3-butadiene. These organic lithiums can be used alone or in combination. The amount of the organic lithium added to the titanocene compound or the half titanocene compound is preferably 0.1 to 10, more preferably 0.2 to 5, in terms of Li/Ti (molar ratio).

Examples of the organic magnesium that may be mixed and reacted with the titanocene compound or the half titanocene compound include dialkyl magnesium and alkyl halogen magnesium typified by Grignard reagents. Specific examples thereof include dimethyl magnesium, diethyl magnesium, dibutyl magnesium, ethylbutyl magnesium, dihexyl magnesium, methyl magnesium bromide, methyl magnesium chloride, ethyl magnesium bromide, ethyl magnesium chloride, butyl magnesium bromide, butyl magnesium chloride, hexyl magnesium bromide, cyclohexyl magnesium bromide, phenyl magnesium bromide, phenyl magnesium chloride, allyl magnesium bromide, and allyl magnesium chloride.

These organic magnesiums can be used alone or in combination. The amount of the organic magnesium added to the titanocene compound or the half titanocene compound is preferably 0.1 to 10, more preferably 0.2 to 5, in terms of Mg/Ti (molar ratio).

Examples of the organic aluminum that may be mixed and reacted with the titanocene compound or the half titanocene compound include trialkyl aluminum, dialkyl aluminum chloride, and alkyl aluminum dichloride. Specific examples of the organic aluminum that can be used include trimethyl aluminum, triethyl aluminum, tributyl aluminum, triisobutyl aluminum, trihexyl aluminum, trioctyl aluminum, tridecyl aluminum, dimethyl aluminum chloride, diethyl aluminum chloride, methyl aluminum dichloride, ethyl aluminum dichloride, and diethyl ethoxy aluminum.

These organic aluminums can be used alone or in combination. The amount of the organic aluminum added to the titanocene compound or the half titanocene compound is preferably 0.1 to 10, more preferably 0.2 to 5, in terms of Al/Ti (molar ratio).

Among these combinations, a product obtained by the mixing and reaction between the titanocene compound and the organic aluminum can be particularly preferably used in the present embodiment because of having high hydrogenation ability. In this case, the titanocene compound and the organic aluminum are presumed to form a metallacyclic compound to become a Tebbe-type complex. Titanocene dichloride selected as the titanocene compound and trimethyl aluminum selected as the organic aluminum are mixed and reacted at a molar ratio of 1:2 to obtain a Tebbe-type complex having high hydrogenation ability. This Tebbe-type complex may be used after being isolated from the reaction mixture or may be used directly in the form of the reaction mixture. The method using the reaction mixture directly is industrially advantageous because complicated isolation procedures can be omitted.

Such reaction between the titanocene compound and the organic aluminum is a relatively slow reaction and therefore requires an adequate time. Specifically, the titanocene compound is dispersed or dissolved in an inert solvent. After addition of the organic aluminum compound, the mixture is reacted at a temperature of 0° C. to 100° C. by sufficient stirring. The reaction temperature of 0° C. or higher can shorten the reaction time. On the other hand, the reaction temperature of 100° C. or lower tends to further improve hydrogenation ability by suppressing side reactions. The temperature is preferably 10° C. to 50° C. The reaction proceeds by two stages and therefore preferably requires room temperature for a time of 1 day or longer.

In order to further enhance the hydrogenation ability of the titanocene compound or the half titanocene compound, a second or third component such as an alcohol, an ether, an amine, a ketone, or a phosphorus compound may be added thereto.

Examples of the alcohol for enhancing the hydrogenation ability of the titanocene compound or the half titanocene compound include methyl alcohol, ethyl alcohol, isopropyl alcohol, butyl alcohol, phenol, and glycols such as ethylene glycol.

Examples of the ether for enhancing the hydrogenation ability of the titanocene compound or the half titanocene compound include: alkyl ethers such as dimethyl ether, diethyl ether, diisopropyl ether, dibutyl ether, tetrahydrofuran, diphenyl ether, ethylene glycol dimethyl ether, ethylene glycol diethyl ether, and ethylene glycol dibutyl ether; and silyl ethers such as bistrimethylsilyl ether.

Examples of the amine for enhancing the hydrogenation ability of the titanocene compound or the half titanocene compound include: secondary amines such as dimethylamine, diethylamine, diisopropylamine, dibutylamine, and diphenylamine; and tertiary amines such as trimethylamine, triethylamine, triisopropylamine, tributylamine, triphenylamine, and N,N,N',N'-tetramethylethylenediamine.

Examples of the ketone for enhancing the hydrogenation ability of the titanocene compound or the half titanocene compound include dimethyl ketone, diethyl ketone, methyl ethyl ketone, methyl phenyl ketone, and ethyl phenyl ketone.

Examples of the phosphorus compound for enhancing the hydrogenation ability of the titanocene compound or the half titanocene compound include phosphorus compounds capable of coordinating with titanocene, for example, trimethylphosphine, triethylphosphine, and triphenylphosphine.

These compounds for enhancing the hydrogenation ability of the titanocene compound or the half titanocene compound can be used alone or in combination. The amount of the compound added to the titanocene compound or the half titanocene compound is 0.01 to 10, preferably 0.02 to 5, more preferably 0.02 to 1, in terms of a molar ratio to Ti.

In addition to the titanocene compound, a compound containing platinum, palladium, palladium-chromium, nickel, or ruthenium may be used as the compound having hydrogenation ability of the present embodiment. A Tebbe reagent or a Tebbe-type complex is preferred.

In the present embodiment, the compound having hydrogenation ability may be used in polymerization after being contacted with the metallocene catalyst in advance, or may be introduced separately from the metallocene catalyst into a polymerization reactor. The amounts of these components used and the ratio between these amounts are not particularly limited. The molar ratio of the metal in the compound having hydrogenation ability to the transition metal in the metallocene catalyst is preferably 0.01 to 1000, more preferably 0.1 to 10. The compound having hydrogenation ability used at a ratio of 0.01 or more tends to further improve the molecular weight. The compound used at a ratio of 1000 or less tends to suppress reduction in polymerization activity.

Examples of the method for polymerizing ethylene according to the present embodiment include the (co)polymerization of monomers including ethylene by a suspension polymerization or vapor-phase polymerization method. The suspension polymerization method is preferred because this method can efficiently remove polymerization heat. In the suspension polymerization method, an inert hydrocarbon vehicle can be used as a vehicle. The olefin itself can also be used as a solvent.

Specific examples of the inert hydrocarbon vehicle can include, but are not particularly limited to: aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

In the ethylene polymerization according to the present embodiment, the polymerization temperature is generally preferably 30° C. or higher and 100° C. or lower, more preferably 35° C. or higher and 90° C. or lower, particularly preferably 40° C. or higher and 80° C. or lower. The polymerization temperature equal to or higher than 30° C. realizes efficient industrial production. On the other hand, the polymerization temperature equal to or lower than 100° C. realizes continuous stable operation.

In the ethylene polymerization according to the present embodiment, the polymerization pressure is generally preferably atmospheric pressure or higher and 2 MPa or lower, more preferably 0.1 MPa or higher and 1.5 MPa or lower, further preferably 0.1 MPa or higher and 1.0 MPa or lower. The polymerization reaction can be carried out by any of batch, semicontinuous, and continuous methods.

Alternatively, the polymerization may be carried out at two or more stages differing in reaction conditions. The molecular weight of the resulting polyethylene can be adjusted by the presence of hydrogen in the polymerization system or by the change of the polymerization temperature, as described in, for example, the specification of West German Patent Application Publication No. 3127133. Particularly, the addition of hydrogen as a chain transfer agent into the polymerization system is preferred because this approach can control the molecular weight within a proper range. In the case of adding hydrogen into the polymerization system, the mole fraction of the hydrogen is preferably 0 mol % or more and 30 mol % or less, more preferably 25 mol % or less, further preferably 20 mol % or less. In the present embodiment, in addition to each component as mentioned above, other components known in the art to be useful in production of the polyethylene can be included.

The slurry concentration and the residence time within the polymerization reactor are particularly important for carrying out the present embodiment. The slurry concentration within the polymerization reactor refers to a value that is calculated according to the expression given below. The slurry concentration is preferably 10 to 50%, more preferably 15 to 45%, from the viewpoint of solubility in a solvent and easy handling.

Mass of the polyethylene powder/(Mass of the polyethylene powder+Mass of the solvent)×100

The residence time within the polymerization reactor refers to a reaction time from the feed of the raw material ethylene into the polymerization reactor to the discharge of the reaction product from the polymerization reactor. The residence time is preferably 0.5 to 7 hours, more preferably 1 to 5 hours, from the viewpoint of solubility in a solvent and easy handling.

The polyethylene powder of the present embodiment may be used, if necessary, in combination with various additives known in the art. Examples of thermal stabilizers include: heat-resistant stabilizers such as tetrakis[methylene(3,5-di-t-butyl-4-hydroxy) hydrocinnamato]methane and distearyl thiodipropionate; and weather-resistant stabilizers such as bis(2,2',6,6'-tetramethyl-4-piperidine)sebacate and 2-(2-hydroxy-t-butyl-5-methylphenyl)-5-chlorobenzotriazole. Also, an inorganic or organic dry color may be added thereto as a colorant. Preferred examples of the additives can also include stearates, such as calcium stearate, magnesium stearate, and zinc stearate, which are known in the art as lubricants, hydrogen chloride absorbers, or the like.

[Use]

The polyethylene powder of the present embodiment is preferably used in high-strength fibers because of its high productivity during a drawing process. The fiber of the present embodiment is produced from the polyolefin powder. Specific examples of the method for producing the fiber of the present embodiment include a method which involves obtaining a thread by a processing method through extrusion in a gel form in an extruder equipped with circular dies in a wet process using a solvent, drawing, extraction, and drying, and further drawing the thread by a processing method to obtain a high-strength fiber.

Such a high-strength fiber can be used in fishing lines, stabproof gloves, ropes for shipping, bulletproof vests, bulletproof covers for armored vehicles, fishing nets, sports goods, sutures, etc.

The fiber may be prepared into a composite fiber with at least one selected from among polyester fibers, nylon fibers, polypropylene fibers, carbon fibers, cellulose fibers, vinylon fibers, and synthetic spider fibers, and can be preferably used in the uses mentioned above.

EXAMPLES

Hereinafter, the present invention will be described with reference to Examples and Comparative Examples. However, the present invention is not intended to be limited by these examples.

First, methods for evaluating the physical properties of the polyethylene powder will be described.

[Method for Measuring Viscosity-Average Molecular Weight of Polyethylene Powder]

1) 10 mg of the polyethylene powder was weighed and added to a test tube.

2) 20 mL of decalin (decahydronaphthalene) was added to the test tube.

3) The polyethylene was dissolved by stirring at 150° C. for 2 hours.

4) The falling time ($t_s$) between gauges of the solution was measured in a thermostat bath of 135° C. using an Ubbelohde-type viscometer.

5) Likewise, the falling time ($t_s$) between gauges was measured as to 5 mg of the polyethylene powder.

6) As a blank test, the falling time ($t_b$) of decalin alone was measured without the addition of polyethylene.

7) The specific viscosity ($\eta_{sp}/C$) of the polyethylene powder determined according to the expression given below was plotted to obtain a linear expression of concentration (C) vs. the specific viscosity ($\eta_{sp}/C$) of the polyethylene powder. The concentration of the polyethylene powder was extrapolated to 0 to determine the intrinsic viscosity ($\eta$).

$$\eta_{sp}/C=(t_s/t_b-1)/0.1$$

8) From this intrinsic viscosity ($\eta$), the viscosity-average molecular weight (Mv) was determined according to the following expression:

$$Mv=5.34\times10^4\eta^{1.49}$$

[Method for Calculating Ratio ($Mv_{75}/Mv_{250}$) of Polyethylene Powder]

1) The polyethylene powder was classified through screen meshes having aperture sizes of 355 μm, 250 μm, 180 μm, 150 μm, 106 μm, and 75 μm according to the specification JIS Z8801.

2) From each fraction of the classified polyethylene powder, a 250-μm screen mesh on-powder and a 75-μm screen mesh pass-powder were separated.

3) The viscosity-average molecular weight ($Mv_{250}$) of the obtained 250-μm screen mesh on-powder and the viscosity-average molecular weight ($Mv_{75}$) of the obtained 75-μm screen mesh pass-powder were measured according to the measurement method described above.

4) $Mv_{75}/Mv_{250}$ was calculated from the obtained viscosity-average molecular weights.

[Method for Calculating Ratio ($BD_{75}/BD_{250}$) of Polyethylene Powder]

1) The polyethylene powder was classified through screen meshes having aperture sizes of 355 μm, 250 μm, 180 μm, 150 μm, 106 μm, and 75 μm according to the specification JIS Z8801.

2) From each fraction of the classified polyethylene powder, a 250-μm screen mesh on-powder and a 75-μm screen mesh pass-powder were separated.

3) If necessary, each powder was sifted through a 1.0-mm sieve.

4) Each powder was allowed to fall down until overflowing to a 100-cc cylindrical container via the orifice of a calibrated funnel having a standard dimension according to JIS K 6891.

5) In order to prevent consolidation or the spill of the powder from the cup, an excessive powder was carefully leveled off from the top of the container by smoothly moving a knife such as a spatula with the knife contacted in a vertical position with the top of the container.

6) The sample was fully removed from the side of the container, and the mass of the powder together with the container was measured. The mass of the vacant container for measurement measured in advance was subtracted therefrom to calculate the mass (m) of the powder on a 0.1 g basis.

7) The bulk density (g/cc) was calculated according to the following expression:

Bulk density (g/cc)=Mass (m) of the powder/Volume (cc) of the cylindrical container 8) This measurement was conducted three times, and an average thereof was recorded.

9) $BD_{75}/BD_{250}$ was calculated from the bulk density ($BD_{250}$) of the 250-μm screen mesh on-powder and the bulk density ($BD_{75}$) of the 75-μm screen mesh pass-powder.

[Method for Measuring Average Particle Size of Polyethylene Powder]

1) The polyethylene powder was classified through standard sieves having aperture sizes of 300 μm, 250 μm, 180 μm, 150 μm, 106 μm, 75 μm, 63 μm, 53 μm, and 38 μm according to the specification JIS Z8801.

2) The weight of the powder recovered in each fraction was measured.

3) The weight fraction (%) of the weight of the powder in each fraction with respect to the total weight of the powder before the classification was calculated.

4) The weight fraction of the powder in each fraction was cumulated in order starting at the weight fraction of the powder fraction having the finest particle size.

5) Finally, 100% by weight was obtained by the addition of the weight fraction of the most coarse powder fraction.

6) A plot was developed with the aperture sizes (particle sizes) as the abscissa and the cumulative weight fraction as the ordinate.

7) A linear expression of the aperture sizes (particle sizes) vs. the cumulative weight fraction on a particle size fraction basis was obtained. The particle size extrapolated to the cumulative weight fraction 50% was used as the average particle size.

[Solubility Evaluation Test]

To a 100-cc Polycup, 4.0 g of the polyethylene powder and 0.012 g (0.3% by mass) of pentaerythrityl-tetrakis-[3-(3,5-di-t-butyl-4-hydroxyphenyl)propionate] as an antioxidant were added, and dry-blended to obtain a mixture of the polymer, etc. 36.0 g (polyethylene concentration: 10% by mass) of liquid paraffin (kinetic viscosity at 37.78° C.: $7.59 \times 10^{-5}$ m$^2$/s) was further added thereto, and the mixture was stirred at room temperature with a spatula to obtain homogeneous slurry.

This slurry was added to LABO PLASTOMILL (model 4C150-01 manufactured by Toyo Seiki Seisaku-Sho Ltd.) set to 190° C., and kneaded at the number of revolutions of 50 rpm for 30 minutes in the nitrogen atmosphere. The mixture (gel) obtained by the kneading was compressed with a press heated to 165° C. to prepare a gel sheet having a thickness of 1.0 mm. A 10 cm×10 cm test piece was cut out of the prepared gel sheet, loaded to a simultaneous biaxial tenter drawing machine heated to 120° C., and kept for 3 minutes. Then, the test piece was drawn at a MD ratio of ×7.0 and a TD ratio of ×7.0 (i.e., a draw ratio of 7×7) at a speed of 12 mm/sec. Next, the sheet thus drawn was sufficiently dipped in methyl ethyl ketone to extract and remove the liquid paraffin. Then, the methyl ethyl ketone was dried off. After the completion of the extraction, the thin film was dried at room temperature for 10 hours. The thin film thus dried was held against the light, while the number of white spots having a diameter of 1 mm or larger (undissolved residues) present in an area of 30 cm×30 cm was counted.

The solubility was evaluated according to the following criteria:

◎: The number of white spots was 5 or less.

○: The number of white spots was 6 or more and 15 or less.

Δ: The number of white spots was 16 or more and 30 or less.

X: The number of white spots was 31 or more.

[Test to Evaluate Productivity of Continuous Processing of Thread] (in Each Table, Indicated by "Productivity of Continuous Processing")

To the polyethylene powder, 0.3% by mass of pentaerythrityl-tetrakis-[3-(3,5-di-t-butyl-4-hydroxyphenyl)propionate] was added as an antioxidant, and dry-blended therewith using a tumbler blender to obtain a mixture of the polymer, etc. The obtained mixture of the polymer, etc. and liquid paraffin (kinetic viscosity at 37.78° C.: $7.59 \times 10^{-5}$ m$^2$/s) were added at a polymer concentration of 8% by mass to a preliminary mixing chamber purged with nitrogen, and stirred at room temperature to obtain homogeneous slurry.

This slurry was supplied to a twin-screw extruder in the nitrogen atmosphere using a pump and melt-kneaded. The melt kneading conditions involved a temperature set to 250° C., the number of screw revolutions of 200 rpm, and a discharge rate of 12 kg/hr. In order to confer discharge stability, a layer of stainless plain-woven screens having aperture sizes of 250 µm, 106 µm, 45 µm, 106 µm, and 250 µm according to the specification JIS Z8801 were disposed via a gear pump downstream of the extruder. The resin pressure immediately upstream thereof was measured using a pressure gage. Then, the gel was processed by spinning through dies for spinning. Then, the productivity of continuous processing was determined according to the criteria given below. Specifically, when the resin pressure ($P_0$) 1 hour after the start of extrusion was used as a reference, the resin pressure at a certain time was defined as P. The rate of increase was defined as follows:

Rate of increase (%)=$(P-P_0)/P_0 \times 100$

The productivity of continuous processing of the thread was evaluated according to the following criteria:

◎: The rate of increase in resin pressure after 120 hours was within ±5%.

○: The rate of increase in resin pressure after 72 hours was 5% or less, and the rate of increase in resin pressure after 120 hours was more than 5% and 10% or less.

Δ: The rate of increase in resin pressure after 72 hours was 5% or less, and the rate of increase in resin pressure after 120 hours was more than 10%.

X: The rate of increase in resin pressure after 72 hours was more than 5%.

[Catalyst Synthesis Examples]

[Preparation of Solid Catalytic Component [I]]

To an 8 L stainless autoclave fully purged with nitrogen, 1600 mL of hexane was added. To this autoclave, 800 mL of a hexane solution containing 1 mol/L titanium tetrachloride and 800 mL of a hexane solution containing 1 mol/L organic magnesium compound represented by the compositional formula AlMg$_5$(C$_4$H$_9$)$_{11}$(OSiH)$_2$ were added at the same time over 4 hours with stirring at 10° C. After the addition, the mixture was gradually heated, and the reaction was continued at 10° C. for 1 hour. In this operation, the number of revolutions for stirring was set to 290 rpm. After the completion of the reaction, 1600 mL of the supernatant was removed, and the resulting solid was washed with 1600 mL of hexane five times to prepare solid catalytic component [I]. The amount of titanium contained per g of this solid catalytic component [I] was 3.05 mmol.

[Preparation of Solid Catalytic Component [I-b]]

To an 8 L stainless autoclave fully purged with nitrogen, 1600 mL of hexane was added. To this autoclave, 800 mL of a hexane solution containing 1 mol/L titanium tetrachloride and 800 mL of a hexane solution containing 1 mol/L organic magnesium compound represented by the compositional formula AlMg$_5$(C$_4$H$_9$)$_{11}$(OSiH)$_2$ were added at the same time over 4 hours with stirring at 10° C. After the addition, the mixture was gradually heated, and the reaction was continued at 10° C. for 1 hour. In this operation, the number of revolutions for stirring was set to 100 rpm. After the completion of the reaction, 1600 mL of the supernatant was removed, and the resulting solid was washed with 1600 mL of hexane five times to prepare solid catalytic component [I-b]. The amount of titanium contained per g of this solid catalytic component [I-b] was 3.10 mmol.

[Preparation of Solid Catalytic Component [II]]
(1) Synthesis of Carrier (II-1)

An 8 L stainless autoclave fully purged with nitrogen was charged with 1000 mL of a hexane solution containing 2 mol/L hydroxytrichlorosilane, and 2550 mL (corresponding to 2.68 mol of magnesium) of a hexane solution of an organic magnesium compound represented by the compositional formula $AlMg_5(C_4H_9)_{11}(OC_4H_9)_2$ was added dropwise thereto over 4 hours with stirring at 65° C. The reaction was continued with further stirring at 65° C. for 1 hour. In this operation, the number of revolutions for stirring was set to 225 rpm. After the completion of the reaction, the supernatant was removed, and the resulting solid was washed with 1800 mL of hexane four times. As a result of analyzing this solid (carrier (II-1)), 8.31 mmol of magnesium was contained per g of the solid.

(2) Preparation of Solid Catalytic Component [II]

To 1970 mL of the hexane slurry containing 110 g of the carrier (II-1), 110 mL of a hexane solution containing 1 mol/L titanium tetrachloride and 110 mL of a hexane solution containing 1 mol/L of an organic magnesium compound represented by the compositional formula $AlMg_5(C_4H_9)_{11}(OSiH)_2$ were added at the same time over 1 hour with stirring at 10° C. After the addition, the reaction was continued at 10° C. for 1 hour. After the completion of the reaction, 1100 mL of the supernatant was removed, and the resulting solid was washed with 1100 mL of hexane twice to prepare a solid catalytic component [II]. The amount of titanium contained in 1 g of this solid catalytic component [II] was 0.75 mmol.

[Preparation of Solid Catalytic Component [II-b]]
(1) Synthesis of Carrier (II-2)

An 8 L stainless autoclave fully purged with nitrogen was charged with 1000 mL of a hexane solution containing 2 mol/L hydroxytrichlorosilane, and 2550 mL (corresponding to 2.68 mol of magnesium) of a hexane solution of an organic magnesium compound represented by the compositional formula $AlMg_5(C_4H_9)_{11}(OC_4H_9)_2$ was added dropwise thereto over 4 hours with stirring at 65° C. The reaction was continued with further stirring at 65° C. for 1 hour. In this operation, the number of revolutions for stirring was set to 100 rpm. After the completion of the reaction, the supernatant was removed, and the resulting solid was washed with 1800 mL of hexane four times. As a result of analyzing this solid (carrier (II-2)), 8.35 mmol of magnesium was contained per g of the solid.

(2) Preparation of Solid Catalytic Component [II-b]

To 1970 mL of the hexane slurry containing 110 g of the carrier (II-2), 110 mL of a hexane solution containing 1 mol/L titanium tetrachloride and 110 mL of a hexane solution containing 1 mol/L of an organic magnesium compound represented by the compositional formula $AlMg_5(C_4H_9)_{11}(OSiH)_2$ were added at the same time over 1 hour with stirring at 10° C. After the addition, the reaction was continued at 10° C. for 1 hour. After the completion of the reaction, 1100 mL of the supernatant was removed, and the resulting solid was washed with 1100 mL of hexane twice to prepare a solid catalytic component [II-b]. The amount of titanium contained in 1 g of this solid catalytic component [II-b] was 0.72 mmol.

[Preparation of Solid Catalytic Component [III]]
(Preparation of Carrier [III-1])

Silica Q6 [manufactured by Fuji Silysia Chemical Ltd.] was used as a precursor of carrier [III-1]. The Silica Q6 was heat-treated at 400° C. for 5 hours in the nitrogen atmosphere. The Silica Q6 thus heat-treated had a specific surface area of 480 $m^2/g$ and an average particle size of 9.5 μm. The amount of surface hydroxy groups on the heat-treated silica was 1.85 mmol/g. In a 1.8 L autoclave purged with nitrogen, this heat-treated Silica Q6 (40 g) was dispersed in 800 mL of hexane to obtain slurry. While the temperature of the obtained slurry was kept at 20° C. with stirring, 80 mL of a hexane solution of triethyl aluminum (concentration: 1 mol/L) was added thereto. Then, the mixture was stirred for 2 hours to prepare 880 mL of hexane slurry of triethyl aluminum-adsorbed carrier [III-1].

(Preparation of Transition Metal Compound Component [III-2])

[(N-t-butylamido)(tetramethyl-$\eta^5$-cyclopentadienyl)dimethylsilane]titanium-1,3-pentadiene (hereinafter, referred to as a "titanium complex") was used as a transition metal compound. An organic magnesium compound represented by the compositional formula $AlMg_6(C_2H_5)_3(C_4H_9)_{12}$ (hereinafter, referred to as "$Mg^1$") was used. This $Mg^1$ was synthesized by mixing predetermined amounts of triethyl aluminum and dibutyl magnesium at 25° C. in hexane.

The titanium complex was dissolved at 200 mmol in 1000 mL of Isopar E [manufactured by Exxon Chemical Co., Inc.]. To this solution, 20 mL of a hexane solution of $Mg^1$ (concentration: 1 mol/L) was added. The titanium complex concentration was adjusted to 0.1 mol/L by the addition of hexane to obtain transition metal compound component [III-2].

(Preparation of Activating Agent [III-3])

Bis(hydrogenated tallow alkyl)methylammonium-tris (pentafluorophenyl) (4-hydroxyphenyl)borate (hereinafter, referred to as a "borate") was used as an activating compound. Ethoxydiethyl aluminum was used as an organic aluminum compound. 5.7 g of the borate was added to 50 mL of toluene and dissolved therein to obtain a 100 mmol/L toluene solution of the borate. To this toluene solution of the borate, 5 mL of a hexane solution of the ethoxydiethyl aluminum (concentration: 1 mol/L) was added at 25° C. The borate concentration in the toluene solution was adjusted to 80 mmol/L by the addition of hexane. Then, the mixture was stirred at 25° C. for 1 hour to obtain activating agent [III-3].

(Preparation of Solid Catalytic Component [III])

To 880 mL of the slurry of the carrier [III-1] obtained by the operation described above, 50 mL of the activating agent [III-3] obtained by the operation described above and 40 mL of the transition metal compound component [III-2] obtained by the operation described above were added at the same time with stirring at 20° C. The reaction was continued at the number of revolutions for stirring set to 90 rpm for 3 hours to obtain solid catalytic component [III].

(Preparation of Solid Catalytic Component [III-b])

To 880 mL of the slurry of the carrier [III-1] obtained by the operation described above, 50 mL of the activating agent [III-3] obtained by the operation described above and 40 mL of the transition metal compound component [III-2] obtained by the operation described above were added at the same time with stirring at 20° C. The reaction was continued at the number of revolutions for stirring set to 25 rpm for 3 hours to obtain solid catalytic component [III-b].

(Preparation of Solid Catalytic Component [IV]))

In a 2 L stainless autoclave fully purged with nitrogen, 90 g of anhydrous magnesium chloride, 336.4 g of decane, and 370.0 g of 2-ethylhexyl alcohol were reacted by heating at 130° C. for 3 hours to obtain a homogeneous solution. To this solution, 23.9 g of 2-isobutyl-2-isopropyl-1,3-dimethoxypropane was added, and the mixture was stirred at 100° C. for 1 hour.

The obtained homogeneous solution was allowed to cool to room temperature. Then, 100 mL of the homogeneous solution was added dropwise with stirring over 60 minutes to 270 mL of titanium tetrachloride kept at −20° C. After the completion of the dropwise addition, the temperature was raised to 110° C. over 6 hours. When the temperature of the solution reached 110° C., 1.85 g of 2-isobutyl-2-isopropyl-1,3-dimethoxypropane was added thereto, and stirring was continued for 2 hours. After 2 hours, hot filtration was carried out. The filtration residue was added to 400 mL of titanium tetrachloride and suspended therein, and the suspension was stirred at 110° C. for 2 hours. After 2 hours, hot filtration was carried out, and the filtration residue was washed with 500 mL of hexane of 60° C. five times to prepare solid catalytic component [IV].

(Preparation of Solid Catalytic Component [V]))

(1) Synthesis of Carrier (V-1)

A 2 L stainless autoclave fully purged with nitrogen was charged with 270 mL of hexane, 8.1 mL of tetrabutoxy titanium, and 79.9 mL of tetraethoxysilane. While the temperature was kept at 5° C. with stirring, 182 mL of a dibutyl ether solution of butyl magnesium chloride (concentration: 2.1 mol/L) was added dropwise to the reactor over 4 hours. After the completion of the dropwise addition, the mixture was stirred at 20° C. for 1 hour and then filtered, and the filtration residue was washed with 300 mL of toluene five times to obtain carrier (V-1).

(2) Preparation of Solid Catalytic Component [V]

To a 1 L stainless autoclave fully purged with nitrogen, the toluene slurry containing 10.0 g of the carrier (V-1) was added, and the total volume was adjusted to 60.0 mL by the addition of toluene. To the reactor, 7.3 mL of phenyltrichlorosilane was added with stirring at room temperature, and subsequently 7.7 mL of di(2-ethylhexyl) phthalate was added. The mixture was heated to 105° C., and stirring was continued for 2 hours. After the completion of the stirring, the supernatant was removed, and the resulting solid was washed with 50 mL of toluene of 105° C. five times. The total volume was adjusted again to 60 mL by the addition of toluene. After heating to 70° C., 5.0 mL of tetrachlorotitanium was added thereto, and the mixture was stirred at 105° C. for 2 hours. Subsequently, the supernatant was removed, and the resulting solid was washed with 50 mL of toluene of 105° C. five times to obtain solid catalytic component [V].

Production Example 1

In Each Table, Indicated by "PE1"

Hexane, ethylene, hydrogen, and the solid catalytic component [I] were continuously supplied to a vessel-type 300 L polymerization reactor equipped with a stirring apparatus. The polymerization pressure was 0.5 MPa. The polymerization temperature was kept at 83° C. by jacket cooling. The hexane was supplied at a rate of 40 L/hr. Triisobutyl aluminum (TIBA) was used as a promoter. The solid catalytic component [I] was added at a rate of 0.2 g/hr to the polymerization reactor, and the triisobutyl aluminum was added at a rate of 10 mmol/hr to the polymerization reactor. The production rate for the polymer derived from the ethylene was 10 kg/hr. The hydrogen was continuously supplied thereto using a pump such that the hydrogen concentration with respect to vapor-phase ethylene was 14 mol %. The catalytic activity was 80,000 g-PE/g-solid catalytic component [I]. The polymer slurry was continuously discharged into a flash drum having a pressure of 0.05 MPa and a temperature of 70° C. such that the level of the polymerization reactor was kept constant to separate unreacted ethylene and hydrogen. In this operation, the slurry concentration was 20%, and the residence time was 2 hours.

The polymer slurry was continuously sent through a solvent separation step to a drying step such that the level of the polymerization reactor was kept constant. Stable continuous operation was successfully performed without generating polymer clumps and also without blocking the slurry-discharging piping.

In deactivation and drying steps, a mixed gas of steam and nitrogen was supplied at a flow rate of 20 Nm$^3$/hr to the powder after the polymerization to deactivate the catalyst and the promoter. To the obtained polyethylene powder, calcium stearate (C60 manufactured by Dainichi Chemical Industry Co., Ltd.) was added at 1500 ppm, and uniformly mixed therewith using a Henschel mixer. The obtained polyethylene powder was sieved through a sieve having an aperture size of 425 μm such that particles that failed to pass through the sieve were removed. The polyethylene powder thus obtained was designated as PE1. PE1 had a molecular weight of 3,050,000, a bulk density of 0.42 g/cc, and an average particle size of 120 μm.

Production Example 2

In Each Table, Indicated by "PE2"

A polyethylene powder was produced in the same way as in Production Example 1. The polyethylene powder thus obtained was further sifted through a screen mesh having an aperture size of 250 μm for the recovery of an on-powder to obtain a polyethylene powder (PE2). PE2 had a molecular weight of 3,000,000, a bulk density of 0.42 g/cc, and an average particle size of 283 μm.

Production Example 3

In Each Table, Indicated by "PE3"

A polyethylene powder (PE3) was produced in the same way as in Production Example 1 except that the slurry concentration was 8%, and the residence time was 8 hours. PE3 had a molecular weight of 3,200,000, a bulk density of 0.40 g/cc, and an average particle size of 110 μm.

Production Example 4

In Each Table, Indicated by "PE4"

A polyethylene powder (PE4) was produced in the same way as in Production Example 1 except that the slurry concentration was 60%, and the residence time was 0.3 hours. PE4 had a molecular weight of 3,150,000, a bulk density of 0.39 g/cc, and an average particle size of 130 μm.

Production Example 5

In Each Table, Indicated by "PE5"

A polyethylene powder (PE5) was produced by the same operation as in Production Example 1 except that the solid catalytic component [I-b] was used instead of the solid catalytic component [I] in the polymerization step. In this operation, the slurry concentration was 20%, and the residence time was 2 hours. PE5 had a molecular weight of 3,000,000, a bulk density of 0.41 g/cc, and an average particle size of 210 μm.

Production Example 6

In Each Table, Indicated by "PE6"

A polyethylene powder (PE6) was produced by the same operation as in Production Example 1 except that the solid catalytic component [II] was used instead of the solid catalytic component [I] in the polymerization step. In this operation, the slurry concentration was 20%, and the residence time was 2 hours. PE6 had a molecular weight of 3,000,000, a bulk density of 0.44 g/cc, and an average particle size of 110 μm.

Production Example 7

In Each Table, Indicated by "PE7"

A polyethylene powder was produced in the same way as in Production Example 6. The polyethylene powder thus obtained was further sifted through a screen mesh having an aperture size of 250 μm for the recovery of an on-powder to obtain a polyethylene powder (PE7). PE7 had a molecular weight of 3,150,000, a bulk density of 0.45 g/cc, and an average particle size of 272 μm.

Production Example 8

In Each Table, Indicated by "PE8"

A polyethylene powder (PE8) was produced in the same way as in Production Example 6 except that the slurry concentration was 8%, and the residence time was 8 hours. PE8 had a molecular weight of 3,100,000, a bulk density of 0.42 g/cc, and an average particle size of 105 μm.

Production Example 9

In Each Table, Indicated by "PE9"

A polyethylene powder (PE9) was produced in the same way as in Production Example 6 except that the slurry concentration was 60%, and the residence time was 0.3 hours. PE9 had a molecular weight of 3,150,000, a bulk density of 0.42 g/cc, and an average particle size of 125 μm.

Production Example 10

In Each Table, Indicated by "PE10"

A polyethylene powder (PE10) was produced by the same operation as in Production Example 6 except that the solid catalytic component [II-b] was used instead of the solid catalytic component [II] in the polymerization step. In this operation, the slurry concentration was 20%, and the residence time was 2 hours. PE10 had a molecular weight of 3,050,000, a bulk density of 0.44 g/cc, and an average particle size of 205 μm.

Production Example 11

In Each Table, Indicated by "PE11"

A polyethylene powder (PE11) was produced by the same operation as in Production Example 1 except that: the solid catalytic component [III] was used instead of the solid catalytic component [I] in the polymerization step; and the Tebbe reagent was supplied at a rate of 0.13 mmol/hr through a line different from that for the metallocene catalyst. In this operation, the slurry concentration was 20%, and the residence time was 2 hours. PE11 had a molecular weight of 3,000,000, a bulk density of 0.44 g/cc, and an average particle size of 145 μm.

Production Example 12

In Each Table, Indicated by "PE12"

A polyethylene powder was produced in the same way as in Production Example 11. The polyethylene powder thus obtained was further sifted through a screen mesh having an aperture size of 250 μm for the recovery of an on-powder to obtain a polyethylene powder (PE12). PE12 had a molecular weight of 3,050,000, a bulk density of 0.44 g/cc, and an average particle size of 295 μm.

Production Example 13

In Each Table, Indicated by "PE13"

A polyethylene powder (PE13) was produced in the same way as in Production Example 11 except that the slurry concentration was 8%, and the residence time was 8 hours. PE13 had a molecular weight of 3,250,000, a bulk density of 0.43 g/cc, and an average particle size of 140 μm.

Production Example 14

In Each Table, Indicated by "PE14"

A polyethylene powder (PE14) was produced in the same way as in Production Example 11 except that the slurry concentration was 60%, and the residence time was 0.3 hours. PE14 had a molecular weight of 3,300,000, a bulk density of 0.42 g/cc, and an average particle size of 155 μm.

Production Example 15

In Each Table, Indicated by "PE15"

A polyethylene powder (PE15) was produced by the same operation as in Production Example 11 except that the solid catalytic component [III-b] was used instead of the solid catalytic component [III] in the polymerization step. In this operation, the slurry concentration was 20%, and the residence time was 2 hours. PE15 had a molecular weight of 3,100,000, a bulk density of 0.44 g/cc, and an average particle size of 225 μm.

Production Example 16

In Each Table, Indicated by "PE16"

A polyethylene powder (PE16) was produced by the same operation as in Production Example 1 except that the solid catalytic component [IV] was used instead of the solid catalytic component [I] in the polymerization step. In this operation, the slurry concentration was 20%, and the residence time was 2 hours. PE16 had a molecular weight of 2,950,000, a bulk density of 0.38 g/cc, and an average particle size of 120 μm.

Production Example 17

In Each Table, Indicated by "PE17"

A polyethylene powder (PE17) was produced by the same operation as in Production Example 1 except that the solid catalytic component [V] was used instead of the solid catalytic component [I] in the polymerization step. In this operation, the slurry concentration was 20%, and the residence time was 2 hours. PE17 had a molecular weight of 3,000,000, a bulk density of 0.42 g/cc, and an average particle size of 210 μm.

Production Example 18

In Each Table, Indicated by "PE18"

A polyethylene powder (PE18) was produced by the same operation as in Production Example 1 except that in the polymerization step, the polymerization temperature was 70° C., and the triisobutyl aluminum was added at a rate of 13 mmol/hr to the polymerization reactor. In this operation, the slurry concentration was 20%, and the residence time was 2 hours. PE18 had a molecular weight of 4,000,000, a bulk density of 0.41 g/cc, and an average particle size of 110 μm.

Production Example 19

In Each Table, Indicated by "PE19"

A polyethylene powder (PE19) was produced in the same way as in Production Example 18 except that the slurry concentration was 8%, and the residence time was 8 hours. PE19 had a molecular weight of 4,200,000, a bulk density of 0.39 g/cc, and an average particle size of 105 μm.

Production Example 20

In Each Table, Indicated by "PE20"

A polyethylene powder (PE20) was produced in the same way as in Production Example 18 except that the slurry concentration was 60%, and the residence time was 0.3 hours. PE20 had a molecular weight of 4,150,000, a bulk density of 0.38 g/cc, and an average particle size of 125 μm.

Production Example 21

In Each Table, Indicated by "PE21"

A polyethylene powder (PE21) was produced by the same operation as in Production Example 6 except that in the polymerization step, the polymerization temperature was 70° C., and the triisobutyl aluminum was added at a rate of 13 mmol/hr to the polymerization reactor. In this operation, the slurry concentration was 20%, and the residence time was 2 hours. PE21 had a molecular weight of 4,050,000, a bulk density of 0.44 g/cc, and an average particle size of 105 μm.

Production Example 22

In Each Table, Indicated by "PE22"

A polyethylene powder (PE22) was produced in the same way as in Production Example 21 except that the slurry concentration was 8%, and the residence time was 8 hours. PE22 had a molecular weight of 4,250,000, a bulk density of 0.41 g/cc, and an average particle size of 100 μm.

Production Example 23

In Each Table, Indicated by "PE23"

A polyethylene powder (PE23) was produced in the same way as in Production Example 21 except that the slurry concentration was 60%, and the residence time was 0.3 hours. PE23 had a molecular weight of 4,200,000, a bulk density of 0.40 g/cc, and an average particle size of 115 μm.

Production Example 24

In Each Table, Indicated by "PE24"

A polyethylene powder (PE24) was produced by the same operation as in Production Example 16 except that in the polymerization step, the polymerization temperature was 70° C., and the triisobutyl aluminum was added at a rate of 13 mmol/hr to the polymerization reactor. In this operation, the slurry concentration was 20%, and the residence time was 2 hours. PE24 had a molecular weight of 4,000,000, a bulk density of 0.41 g/cc, and an average particle size of 205 μm.

Production Example 25

In Each Table, Indicated by "PE25"

A polyethylene powder (PE25) was produced by the same operation as in Production Example 1 except that in the polymerization step, the polymerization temperature was 60° C., and the triisobutyl aluminum was added at a rate of 13 mmol/hr to the polymerization reactor. In this operation, the slurry concentration was 20%, and the residence time was 2 hours. PE25 had a molecular weight of 6,050,000, a bulk density of 0.42 g/cc, and an average particle size of 105 μm.

Production Example 26

In Each Table, Indicated by "PE26"

A polyethylene powder (PE26) was produced in the same way as in Production Example 25 except that the slurry concentration was 8%, and the residence time was 8 hours. PE26 had a molecular weight of 6,300,000, a bulk density of 0.40 g/cc, and an average particle size of 100 μm.

Production Example 27

In Each Table, Indicated by "PE27"

A polyethylene powder (PE27) was produced in the same way as in Production Example 25 except that the slurry concentration was 60%, and the residence time was 0.3 hours. PE27 had a molecular weight of 6,250,000, a bulk density of 0.39 g/cc, and an average particle size of 120 μm.

Production Example 28

In Each Table, Indicated by "PE28"

A polyethylene powder (PE28) was produced by the same operation as in Production Example 6 except that in the polymerization step, the polymerization temperature was 60° C., and the triisobutyl aluminum was added at a rate of 13 mmol/hr to the polymerization reactor. In this operation, the slurry concentration was 20%, and the residence time was 2 hours. PE28 had a molecular weight of 6,050,000, a bulk density of 0.44 g/cc, and an average particle size of 95 µm.

Production Example 29

In Each Table, Indicated by "PE29"

A polyethylene powder (PE29) was produced in the same way as in Production Example 28 except that the slurry concentration was 8%, and the residence time was 8 hours. PE29 had a molecular weight of 6,300,000, a bulk density of 0.41 g/cc, and an average particle size of 90 µm.

Production Example 30

In Each Table, Indicated by "PE30"

A polyethylene powder (PE30) was produced in the same way as in Production Example 28 except that the slurry concentration was 60%, and the residence time was 0.3 hours. PE30 had a molecular weight of 6,250,000, a bulk density of 0.40 g/cc, and an average particle size of 115 µm.

Production Example 31

In Each Table, Indicated by "PE31"

A polyethylene powder (PE31) was produced by the same operation as in Production Example 16 except that in the polymerization step, the polymerization temperature was 60° C., and the triisobutyl aluminum was added at a rate of 13 mmol/hr to the polymerization reactor. In this operation, the slurry concentration was 20%, and the residence time was 2 hours. PE31 had a molecular weight of 6,000,000, a bulk density of 0.38 g/cc, and an average particle size of 100 µm.

Production Example 32

In Each Table, Indicated by "PE32"

A polyethylene powder (PE32) was produced by the same operation as in Production Example 17 except that in the polymerization step, the polymerization temperature was 60° C., and the triisobutyl aluminum was added at a rate of 13 mmol/hr to the polymerization reactor. In this operation, the slurry concentration was 20%, and the residence time was 2 hours. PE32 had a molecular weight of 6,000,000, a bulk density of 0.41 g/cc, and an average particle size of 200 µm.

Production Example 33

In Each Table, Indicated by "PE33"

A polyethylene powder (PE33) was produced by the same operation as in Production Example 1 except that the solid catalytic component [I] and an organic magnesium compound represented by $AlMg_5(C_4H_9)_{11}(OSiH)_2$ (n-BAMS) as a promoter were used in the polymerization step. In this operation, the slurry concentration was 20%, and the residence time was 2 hours. PE33 had a molecular weight of 2,950,000, a bulk density of 0.41 g/cc, and an average particle size of 115 µm.

Production Example 34

In Each Table, Indicated by "PE34"

A polyethylene powder (PE34) was produced in the same way as in Production Example 33 except that the slurry concentration was 8%, and the residence time was 8 hours. PE34 had a molecular weight of 3,100,000, a bulk density of 0.39 g/cc, and an average particle size of 105 µm.

Production Example 35

In Each Table, Indicated by "PE35"

A polyethylene powder (PE35) was produced in the same way as in Production Example 33 except that the slurry concentration was 60%, and the residence time was 0.3 hours. PE35 had a molecular weight of 3,150,000, a bulk density of 0.38 g/cc, and an average particle size of 125 µm.

Production Example 36

In Each Table, Indicated by "PE36"

A polyethylene powder (PE36) was produced by the same operation as in Production Example 6 except that the solid catalytic component [II] and an organic magnesium compound represented by $AlMg_5(C_4H_9)_{11}(OSiH)_2$ as a promoter were used in the polymerization step. In this operation, the slurry concentration was 20%, and the residence time was 2 hours. PE36 had a molecular weight of 3,050,000, a bulk density of 0.45 g/cc, and an average particle size of 105 µm.

Production Example 37

In Each Table, Indicated by "PE37"

A polyethylene powder (PE37) was produced in the same way as in Production Example 36 except that the slurry concentration was 8%, and the residence time was 8 hours. PE37 had a molecular weight of 3,200,000, a bulk density of 0.41 g/cc, and an average particle size of 90 µm.

Production Example 38

In Each Table, Indicated by "PE38"

A polyethylene powder (PE38) was produced in the same way as in Production Example 36 except that the slurry concentration was 60%, and the residence time was 0.3 hours. PE38 had a molecular weight of 3,250,000, a bulk density of 0.40 g/cc, and an average particle size of 120 µm.

Production Example 39

In Each Table, Indicated by "PE39"

A polyethylene powder (PE39) was produced by the same operation as in Production Example 16 except that the solid catalytic component [IV] and an organic magnesium compound represented by $AlMg_5(C_4H_9)_{11}(OSiH)_2$ as a promoter were used in the polymerization step. In this operation, the slurry concentration was 20%, and the residence time was 2 hours. PE39 had a molecular weight of 3,000,000, a bulk density of 0.39 g/cc, and an average particle size of 115 μm.

Production Example 40

In Each Table, Indicated by "PE40"

A polyethylene powder (PE40) was produced by the same operation as in Production Example 17 except that the solid catalytic component [V] and an organic magnesium compound represented by $AlMg_5(C_4H_9)_{11}(OSiH)_2$ as a promoter were used in the polymerization step. In this operation, the slurry concentration was 20%, and the residence time was 2 hours. PE40 had a molecular weight of 2,950,000, a bulk density of 0.42 g/cc, and an average particle size of 205 μm.

Examples 1 to 27

PE1, PE3, PE4, PE6, PE8, PE9, PE11, PE13, PE14, PE18, PE19, PE20, PE21, PE22, PE23, PE25, PE26, PE27, PE28, PE29, PE30, PE33, PE34, PE35, PE36, PE37, and PE38 were used to calculate the values of $Mv_{75}/Mv_{250}$ and $BD_{75}/BD_{250}$ and to evaluate the solubility and the productivity of continuous processing according to the evaluation methods described above. The results are shown in Table 1.

Comparative Examples 1 to 13

PE2, PE5, PE7, PE10, PE12, PE15, PE16, PE17, PE24, PE31, PE32, PE39, and PE40 were used to calculate the values of $Mv_{75}/Mv_{250}$ and $BD_{75}/BD_{250}$ and to evaluate the solubility and the productivity of continuous processing according to the evaluation methods described above. The results are shown in Table 2.

TABLE 1

|  |  | Production Example |  |  |  |  |  |  |  |  |  |
|---|---|---|---|---|---|---|---|---|---|---|---|
|  |  | 1 | 3 | 4 | 6 | 8 | 9 | 11 | 13 | 14 | 18 |
|  |  | Example |  |  |  |  |  |  |  |  |  |
|  |  | 1 | 2 | 3 | 4 | 5 | 6 | 7 | 8 | 9 | 10 |
| Catalyst |  | I | I | I | II | II | II | III | III | III | I |
| Promoter | TIBA | 10 | 10 | 10 | 10 | 10 | 10 | 10 | 10 | 10 | 13 |
|  | n-BAMS | — | — | — | — | — | — | — | — | — | — |
| Tebbe reagent | (mmol/hr) | — | — | — | — | — | — | 0.13 | 0.13 | 0.13 | — |
| Polymerization temperature | (° C.) | 83 | 83 | 83 | 83 | 83 | 83 | 83 | 83 | 83 | 70 |
| Slurry concentration | (%) | 20 | 8 | 60 | 20 | 8 | 60 | 20 | 8 | 60 | 20 |
| Residence time | (hrs) | 2 | 8 | 0.3 | 2 | 8 | 0.3 | 2 | 8 | 0.3 | 2 |
| Sieve | (um) | 425 | 425 | 425 | 425 | 425 | 425 | 425 | 425 | 425 | 425 |
| Powder |  | PE1 | PE3 | PE4 | PE6 | PE8 | PE9 | PE11 | PE13 | PE14 | PE18 |
| Viscosity-average molecular weight | (×10$^4$) | 305 | 320 | 315 | 300 | 310 | 315 | 300 | 325 | 330 | 400 |
| Bulk density | (g/cc) | 0.42 | 0.40 | 0.39 | 0.44 | 0.42 | 0.42 | 0.44 | 0.43 | 0.42 | 0.41 |
| Average particle size | (μm) | 120 | 110 | 130 | 110 | 105 | 125 | 145 | 140 | 155 | 110 |
| $Mv_{75}/Mv_{250}$ |  | 0.91 | 0.81 | 1.13 | 0.96 | 0.85 | 1.14 | 0.92 | 0.85 | 1.18 | 0.93 |
| $BD_{75}/BD_{250}$ |  | 1.09 | 1.02 | 1.15 | 0.99 | 0.87 | 1.13 | 1.04 | 0.98 | 1.12 | 1.08 |
| Solubility |  | ◎ | ○ | ○ | ◎ | ○ | ○ | ◎ | ○ | ○ | ◎ |
| Productivity of continuous processing |  | ◎ | ○ | ○ | ◎ | ○ | ○ | ◎ | ○ | ○ | ◎ |

|  |  | Production Example |  |  |  |  |  |  |  |  |  |
|---|---|---|---|---|---|---|---|---|---|---|---|
|  |  | 19 | 20 | 21 | 22 | 23 | 25 | 26 | 27 | 28 | 29 |
|  |  | Example |  |  |  |  |  |  |  |  |  |
|  |  | 11 | 12 | 13 | 14 | 15 | 16 | 17 | 18 | 19 | 20 |
| Catalyst |  | I | I | II | II | II | I | I | I | II | II |
| Promoter | TIBA | 13 | 13 | 13 | 13 | 13 | 13 | 13 | 13 | 13 | 13 |
|  | n-BAMS | — | — | — | — | — | — | — | — | — | — |
| Tebbe reagent | (mmol/hr) | — | — | — | — | — | — | — | — | — | — |
| Polymerization temperature | (° C.) | 70 | 70 | 70 | 70 | 70 | 60 | 60 | 60 | 60 | 60 |
| Slurry concentration | (%) | 8 | 60 | 20 | 8 | 60 | 20 | 8 | 60 | 20 | 8 |
| Residence time | (hrs) | 8 | 0.3 | 2 | 8 | 0.3 | 2 | 8 | 0.3 | 2 | 8 |
| Sieve | (um) | 425 | 425 | 425 | 425 | 425 | 425 | 425 | 425 | 425 | 425 |
| Powder |  | PE19 | PE20 | PE21 | PE22 | PE23 | PE25 | PE26 | PE27 | PE28 | PE29 |
| Viscosity-average molecular weight | (×10$^4$) | 420 | 415 | 405 | 425 | 420 | 605 | 630 | 625 | 605 | 630 |

TABLE 1-continued

| | | | | | | | | | | | |
|---|---|---|---|---|---|---|---|---|---|---|---|
| Bulk density | (g/cc) | 0.39 | 0.38 | 0.44 | 0.41 | 0.40 | 0.42 | 0.40 | 0.39 | 0.44 | 0.41 |
| Average particle size | (μm) | 105 | 125 | 105 | 100 | 115 | 105 | 100 | 120 | 95 | 90 |
| $Mv_{75}/Mv_{250}$ | | 0.83 | 1.16 | 1.02 | 0.88 | 1.16 | 0.95 | 0.87 | 1.18 | 0.98 | 1.01 |
| $BD_{75}/BD_{250}$ | | 1.02 | 1.17 | 1.01 | 0.89 | 1.14 | 1.09 | 1.05 | 1.19 | 1.03 | 1.05 |
| Solubility | | ○ | ○ | ◎ | ○ | ○ | ◎ | ○ | ○ | ◎ | ○ |
| Productivity of continuous processing | | ○ | ○ | ◎ | ○ | ○ | ○ | ○ | ○ | ◎ | ○ |

| | | Production Example | | | | | | |
|---|---|---|---|---|---|---|---|---|
| | | 30 | 33 | 34 | 35 | 36 | 37 | 38 |
| | | Example | | | | | | |
| | | 21 | 22 | 23 | 24 | 25 | 26 | 27 |
| Catalyst | | II | I | I | I | II | II | II |
| Promoter | TIBA | 13 | — | — | — | — | — | — |
| | n-BAMS | — | 10 | 10 | 10 | 10 | 10 | 10 |
| Tebbe reagent | (mmol/hr) | — | — | — | — | — | — | — |
| Polymerization temperature | (° C.) | 60 | 83 | 83 | 83 | 83 | 83 | 83 |
| Slurry concentration | (%) | 60 | 20 | 8 | 60 | 20 | 8 | 60 |
| Residence time | (hrs) | 0.3 | 2 | 8 | 0.3 | 2 | 8 | 0.3 |
| Sieve | (um) | 425 | 425 | 425 | 425 | 425 | 425 | 425 |
| Powder | | PE30 | PE33 | PE34 | PE35 | PE36 | PE37 | PE38 |
| Viscosity-average molecular weight | (×10$^4$) | 625 | 295 | 310 | 315 | 305 | 320 | 325 |
| Bulk density | (g/cc) | 0.40 | 0.41 | 0.39 | 0.38 | 0.45 | 0.41 | 0.40 |
| Average particle size | (μm) | 115 | 115 | 105 | 125 | 105 | 90 | 120 |
| $Mv_{75}/Mv_{250}$ | | 0.94 | 0.91 | 0.75 | 1.12 | 0.99 | 0.86 | 1.13 |
| $BD_{75}/BD_{250}$ | | 1.07 | 1.09 | 1.07 | 1.18 | 1.00 | 0.88 | 1.15 |
| Solubility | | ○ | ◎ | ○ | ○ | ◎ | ○ | ○ |
| Productivity of continuous processing | | ○ | ◎ | ○ | ○ | ◎ | ○ | ○ |

TABLE 2

| | | Production Example | | | | | | | | | | | | |
|---|---|---|---|---|---|---|---|---|---|---|---|---|---|---|
| | | 2 | 5 | 7 | 10 | 12 | 15 | 16 | 17 | 24 | 31 | 32 | 39 | 40 |
| | | Comparative Example | | | | | | | | | | | | |
| | | 1 | 2 | 3 | 4 | 5 | 6 | 7 | 8 | 9 | 10 | 11 | 12 | 13 |
| Catalyst | | I | I-b | II | II-b | III | III-b | IV | V | IV | IV | V | IV | V |
| Promoter | TIBA | 10 | 10 | 10 | 10 | 10 | 10 | 10 | 10 | 13 | 13 | 13 | — | — |
| | n-BAMS | — | — | — | — | — | — | — | — | — | — | — | 10 | 10 |
| Tebbe reagent | (mmol/hr) | — | — | — | — | 0.13 | 0.13 | — | — | — | — | — | — | — |
| Polymerization temperature | (° C.) | 83 | 83 | 83 | 83 | 83 | 83 | 83 | 83 | 70 | 60 | 60 | 83 | 83 |
| Slurry concentration | (%) | 20 | 20 | 20 | 20 | 20 | 20 | 20 | 20 | 20 | 20 | 20 | 20 | 20 |
| Residence time | (hrs) | 2 | 2 | 2 | 2 | 2 | 2 | 2 | 2 | 2 | 2 | 2 | 2 | 2 |
| Sieve | (um) | 425/250 | 425 | 425/250 | 425 | 425/250 | 425 | 425 | 425 | 425 | 425 | 425 | 425 | 425 |
| Powder | | PE2 | PE5 | PE7 | PE10 | PE12 | PE15 | PE16 | PE17 | PE24 | PE31 | PE32 | PE39 | PE40 |
| Viscosity-average molecular weight | (×10$^4$) | 300 | 300 | 315 | 305 | 305 | 310 | 295 | 300 | 400 | 600 | 600 | 300 | 295 |

TABLE 2-continued

| | | Production Example | | | | | | | | | | | | |
|---|---|---|---|---|---|---|---|---|---|---|---|---|---|---|
| | | 2 | 5 | 7 | 10 | 12 | 15 | 16 | 17 | 24 | 31 | 32 | 39 | 40 |
| | | Comparative Example | | | | | | | | | | | | |
| | | 1 | 2 | 3 | 4 | 5 | 6 | 7 | 8 | 9 | 10 | 11 | 12 | 13 |
| Bulk density | (g/cc) | 0.42 | 0.41 | 0.45 | 0.44 | 0.44 | 0.44 | 0.38 | 0.42 | 0.41 | 0.38 | 0.41 | 0.39 | 0.42 |
| Average particle size | (μm) | 283 | 210 | 272 | 205 | 295 | 225 | 120 | 210 | 205 | 100 | 200 | 115 | 205 |
| $Mv_{75}/Mv_{250}$ | | — | 0.97 | — | 0.98 | — | 1.04 | 0.95 | 0.64 | 0.67 | 0.96 | 0.65 | 0.89 | 0.66 |
| $BD_{75}/BD_{250}$ | | — | 1.08 | — | 1.02 | — | 1.06 | 1.42 | 0.68 | 0.66 | 1.45 | 0.67 | 1.42 | 0.65 |
| Solubility | | X | Δ | X | Δ | X | Δ | Δ | Δ | X | X | X | Δ | Δ |
| Productivity of continuous processing | | X | Δ | X | Δ | X | Δ | Δ | X | Δ | X | Δ | Δ | X |

As is evident from the comparison between Examples and Comparative Examples, use of the polyethylene powder of the present invention was shown to reduce an undissolved residue and improve the productivity of continuous processing of a thread because the powder had favorable solubility in a solvent.

The polyethylene powder of the present invention has exceedingly favorable solubility in a solvent and yields only a small amount of an undissolved powder residue before a spinning step. Therefore, the polyethylene powder of the present embodiment can attain high productivity without causing the clogging of a screen mesh in an extruder, end breakages, etc.

What is claimed is:

1. A polyolefin powder comprising a homopolymer of ethylene or a copolymer of ethylene and an α-olefin having 3 to 15 carbon atoms, wherein
    the polyolefin powder has a viscosity-average molecular weight of 800,000 to 13,000,000,
    a ratio ($Mv_{75}/Mv_{250}$) of a viscosity-average molecular weight ($Mv_{75}$) of a pass-powder in a classification of the polyolefin powder through a screen mesh having an aperture size of 75 μm to a viscosity-average molecular weight ($Mv_{250}$) of an on-powder in the classification thereof through a screen mesh having an aperture size of 250 μm is 0.7 to 1.4,
    a ratio ($BD_{75}/BD_{250}$) of a bulk density ($BD_{75}$) of a pass-powder in the classification of the polyolefin powder through a screen mesh having an aperture size of 75 μm to a bulk density ($BD_{250}$) of an on-powder in the classification thereof through a screen mesh having an aperture size of 250 μm is 0.7 to 1.4, and
    the polyolefin powder has an average particle size of 200 μm or smaller.
2. The polyolefin powder according to claim 1, wherein the $Mv_{75}/Mv_{250}$ is 0.8 to 1.2.
3. The polyolefin powder according to claim 1, wherein the $Mv_{75}/Mv_{250}$ is 0.9 to 1.1.
4. The polyolefin powder according to claim 1, wherein the $BD_{75}/BD_{250}$ is 0.8 to 1.2.
5. The polyolefin powder according to claim 1, wherein the $BD_{75}/BD_{250}$ is 0.9 to 1.1.
6. A fiber which is produced from the polyolefin powder according to claim 1.
7. A fiber which is produced from the polyolefin powder according to claim 2.
8. A fiber which is produced from the polyolefin powder according to claim 3.
9. A fiber which is produced from the polyolefin powder according to claim 4.
10. A fiber which is produced from the polyolefin powder according to claim 5.
11. The polyolefin powder according to claim 2, wherein the $Mv_{75}/Mv_{250}$ is 0.9 to 1.1.
12. The polyolefin powder according to claim 2, wherein the $BD_{75}/BD_{250}$ is 0.8 to 1.2.
13. The polyolefin powder according to claim 2, wherein the $BD_{75}/BD_{250}$ is 0.9 to 1.1.
14. The polyolefin powder according to claim 3, wherein the $BD_{75}/BD_{250}$ is 0.8 to 1.2.
15. The polyolefin powder according to claim 3, wherein the $BD_{75}/BD_{250}$ is 0.9 to 1.1.
16. The polyolefin powder according to claim 4, wherein the $BD_{75}/BD_{250}$ is 0.9 to 1.1.

* * * * *